(12) United States Patent
Szymanski

(10) Patent No.: US 12,244,576 B2
(45) Date of Patent: *Mar. 4, 2025

(54) METHODS TO STRENGTHEN CYBER-SECURITY AND PRIVACY IN A DETERMINISTIC INTERNET OF THINGS

(71) Applicant: Ted H. Szymanski, Toronto (CA)

(72) Inventor: Ted H. Szymanski, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/241,650

(22) Filed: Sep. 1, 2023

(65) Prior Publication Data

US 2024/0244038 A1    Jul. 18, 2024

Related U.S. Application Data

(63) Continuation of application No. 17/234,627, filed on Apr. 19, 2021, now Pat. No. 11,784,984, which is a (Continued)

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0894* (2013.01); *H04L 9/14* (2013.01);
(Continued)

(58) Field of Classification Search
CPC ..... H04L 63/0428; H04L 9/0894; H04L 9/14; H04L 47/2483; H04L 47/528;
(Continued)

(56) References Cited

U.S. PATENT DOCUMENTS 4,153,943 A * 5/1979 Anderson ......... G06F 16/90339
710/21
4,796,254 A * 1/1989 van Baardwijk .. H04Q 11/0478
340/2.2
(Continued)

FOREIGN PATENT DOCUMENTS

EP       0901301 A2    3/1999
WO    2017059550 A1    4/2017

OTHER PUBLICATIONS

International Search Report mailed Apr. 25, 2017, for corresponding International Patent Application No. PCT/CA2017/050129.
(Continued)

*Primary Examiner* — Mohammed Waliullah

(57) ABSTRACT

Methods to strengthen the cyber-security and privacy in a proposed deterministic Internet of Things (IoT) network are described. The proposed deterministic IoT consists of a network of simple deterministic packet switches under the control of a low-complexity 'Software Defined Networking' (SDN) control-plane. The network can transport 'Deterministic Traffic Flows' (DTFs), where each DTF has a source node, a destination node, a fixed path through the network, and a deterministic or guaranteed rate of transmission. The SDN control-plane can configure millions of distinct interference-free 'Deterministic Virtual Networks' (DVNs) into the IoT, where each DVN is a collection of interference-free DTFs. The SDN control-plane can configure each deterministic packet switch to store several deterministic periodic schedules, defined for a scheduling-frame which comprises F time-slots. The schedules of a network determine which DTFs are authorized to transmit data over each fiber-optic link of the network. These schedules also ensure that each DTF will receive a deterministic rate of transmission through every switch it traverses, with full immunity to congestion, interference and Denial-of-Service (DOS)

(Continued)

A Network.

Layer 3 and Layer 2.

attacks. Any unauthorized transmissions by a cyber-attacker can also be detected quickly, since the schedules also identify unauthorized transmissions. Each source node and destination node of a DTF, and optionally each switch in the network, can have a low-complexity private-key encryption/decryption unit. The SDN control-plane can configure the source and destination nodes of a DTF, and optionally the switches in the network, to encrypt and decrypt the packets of a DTF using these low-complexity encryption/decryption units. To strengthen security and privacy and to lower the energy use, the private keys can be very large, for example several thousands of bits. The SDN control-plane can configure each DTF to achieve a desired level of security well beyond what is possible with existing schemes such as AES, by using very long keys. The encryption/decryption units also use a new serial permutation unit the very low hardware cost, which allows for exceptional security and very-high throughputs in FPGA hardware.

33 Claims, 11 Drawing Sheets

Related U.S. Application Data continuation of application No. 16/075,402, filed as application No. PCT/CA2017/050129 on Feb. 3, 2017, now Pat. No. 11,019,038.

(60) Provisional application No. 62/290,712, filed on Feb. 3, 2016.

(51) Int. Cl.
  *H04L 9/14* (2006.01)
  *H04L 45/64* (2022.01)
  *H04L 47/2483* (2022.01)
  *H04L 47/52* (2022.01)
  *H04L 47/62* (2022.01)
  *H04L 49/00* (2022.01)
  *H04L 49/101* (2022.01)
  *H04L 49/253* (2022.01)
  *H04L 67/12* (2022.01)

(52) U.S. Cl.
  CPC ........ *H04L 47/2483* (2013.01); *H04L 47/528* (2013.01); *H04L 47/621* (2013.01); *H04L 49/101* (2013.01); *H04L 49/254* (2013.01); *H04L 49/30* (2013.01); *H04L 63/1458* (2013.01); *H04L 67/12* (2013.01); *H04L 45/64* (2013.01); *H04L 49/3027* (2013.01)

(58) Field of Classification Search
  CPC ....... H04L 49/101; H04L 49/30; H04L 67/12; H04L 63/1458; H04L 47/621; H04L 49/254; H04L 49/3027; H04L 45/64
  See application file for complete search history.

(56) References Cited

U.S. PATENT DOCUMENTS

| | | | |
|---|---|---|---|
| 6,563,837 B2* | 5/2003 | Krishna | H04L 12/5601 370/413 |
| 8,089,959 B2 | 1/2012 | Szymanski | |
| 8,503,440 B2 | 8/2013 | Szymanski | |
| 8,619,566 B2 | 12/2013 | Szymanski | |
| 8,665,722 B2 | 3/2014 | Szymanski | |
| 8,681,609 B2 | 3/2014 | Szymanski | |
| 2011/0044174 A1 | 2/2011 | Szymanski | |
| 2011/0235509 A1 | 9/2011 | Szymanski | |
| 2013/0279340 A1 | 10/2013 | Nakash et al. | |
| 2014/0241443 A1 | 8/2014 | Nowick et al. | |
| 2014/0334821 A1 | 11/2014 | Mehrvar | |
| 2018/0152377 A1 | 5/2018 | Wetterwald et al. | |

OTHER PUBLICATIONS

Written Opinion mailed Apr. 25, 2017, for corresponding International Patent Application No. PCT/CA2017/050129.
International Preliminary Report on Patentability mailed Aug. 7, 2018, for corresponding International Patent Application No. PCT/CA2017/050129.
Szymanski, "Supporting Consumer Services in a Deterministic Industrial Internet Core Network", IEEE Communications Magazine, Jun. 2016, pp. 110-117, vol. 54, No. 6.
Szymanski, "An Ultra-Low Latency Guaranteed-Rate Internet for Cloud Services", IEEE/ACM Transactions on Networking, Feb. 2016, pp. 123-136, vol. 24, No. 1.
Granjal et al., "Security for the internet of things: a survey of existing protocols and open research issues", IEEE Communications Surveys & Tutorials, Aug. 2015, pp. 1294-1312, vol. 17, No. 3.
Keoh et al., "Securing the internet of things: A standardization perspective", IEEE Internet of Things Journal, Jun. 2014, pp. 265-275, vol. 1, No. 3.
Dabbagh et al., "Software-defined networking security: pros and cons", IEEE Communications Magazine, Jun. 2015, pp. 73-79, vol. 53, No. 6.
Moriarty et al., IETF Request for Comments: 8017, "PKCS# 1: RSA Cryptography Specifications Version 2.2.", Nov. 2016.
National Institute of Standards and Technology (NIST), "Announcing the Advanced Encryption Standard (AES)", US Federal Information Processing Standards Publication (FIPS PUBS), Nov. 26, 2001, pp. 1-51, No. 197.
Borghoff et al., "Prince—a low-latency block cipher for pervasive computing applications", Int. Conf. on the Theory and Application of Cryptology and Information Security, 2012, pp. 208-225, International Association for Cryptologic Research, Springer Berlin Heidelberg.
Even et al., "A construction of a cipher from a single pseudorandom permutation", Int. Conf. on the Theory and Application of Cryptology, Nov. 11, 1991, pp. 210-224, Springer Berlin Heidelberg.
Bogdanov et al., "Key-alternating ciphers in a provable setting: encryption using a small number of public permutations", In Annual Int. Conf. on the Theory and Applications of Cryptographic Techniques, 2012, pp. 45-62, Springer Berlin Heidelberg.
Chen et al., "Tight security bounds for key-alternating ciphers", Annual Int. Conf. on the Theory and Applications of Cryptographic Techniques, May 11, 2014, pp. 327-350, Springer Berlin Heidelberg.
Wang et al., "FPGA-based 40.9-Gbits/s masked AES with area optimization for storage area network", IEEE Trans. on Circuits and Systems II: Express Briefs, Jan. 2013, pp. 36-40, vol. 60, No. 1.
Szymanski, "Securing the Industrial-Tactile Internet of Things with Deterministic Silicon-Photonics Switches", IEEE Access Magazine, Sep. 2016, pp. 8236-8249, vol. 4.
Szymanski, "A Secure Industrial Internet of Things (IIoT) using Deterministic Photonic Packet Switches", IEEE End-to-End Trust and Security Workshop, Feb. 4, 2016, Washington DC.
Szymanski, "Deterministic Photonic Packet Switching for a Green Industrial Internet of Things".

* cited by examiner

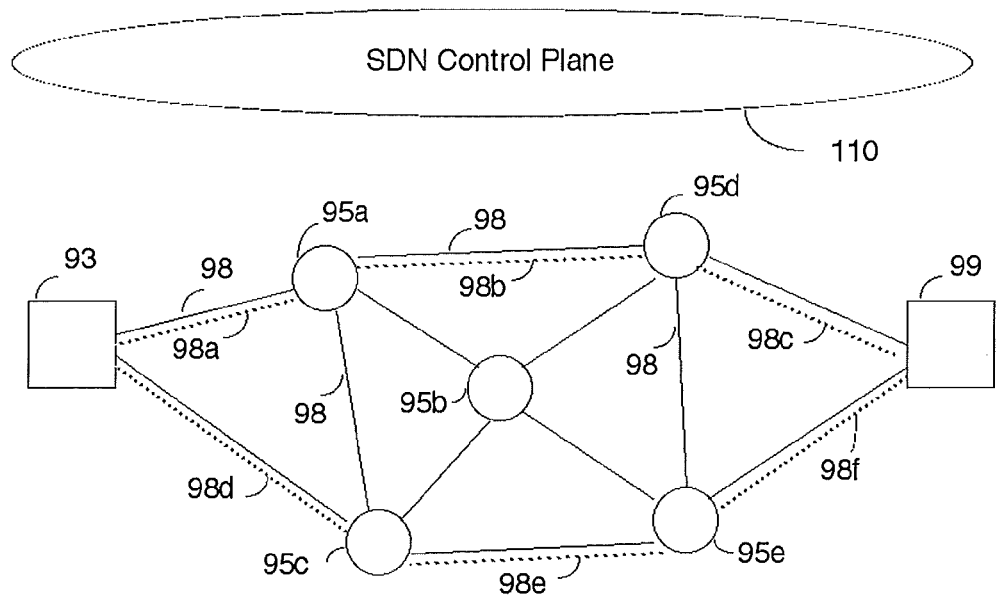
FIG. 1A: A Network.
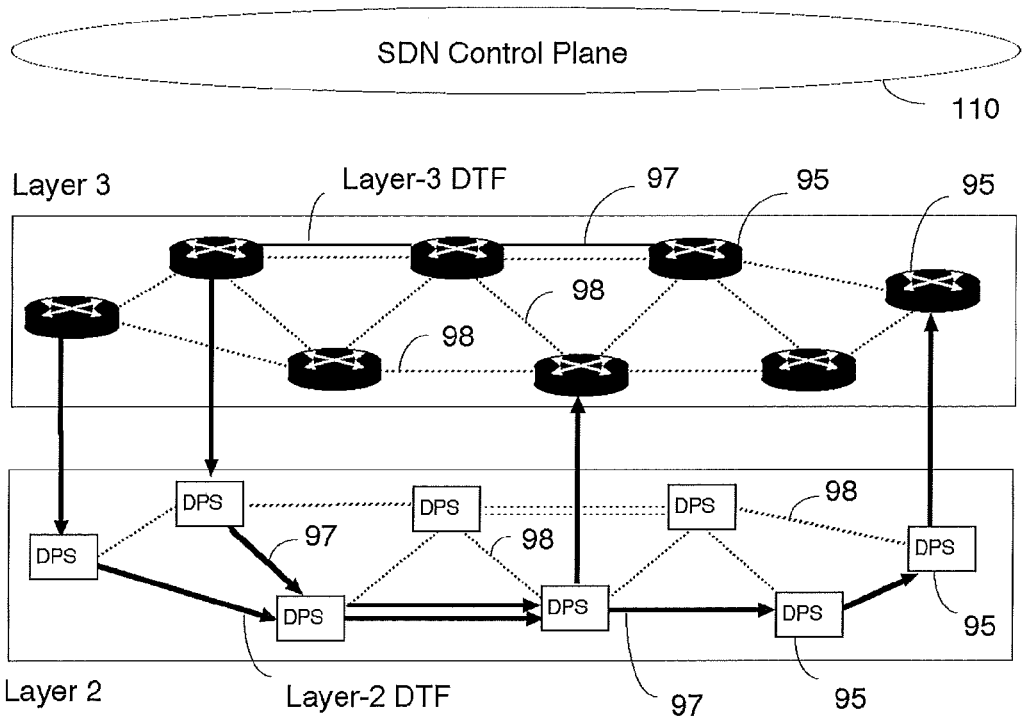
FIG. 1B: Layer 3 and Layer 2.

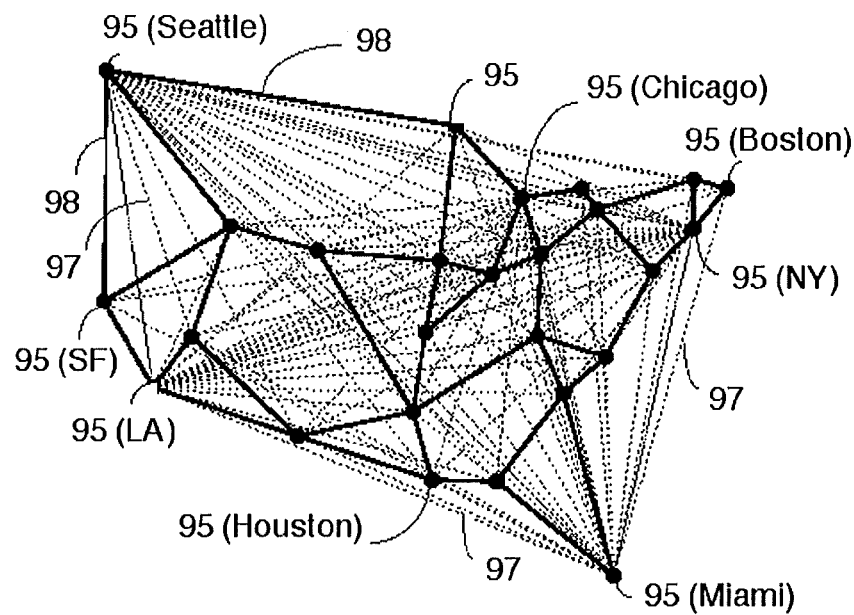
FIG. 2A: A USA network.
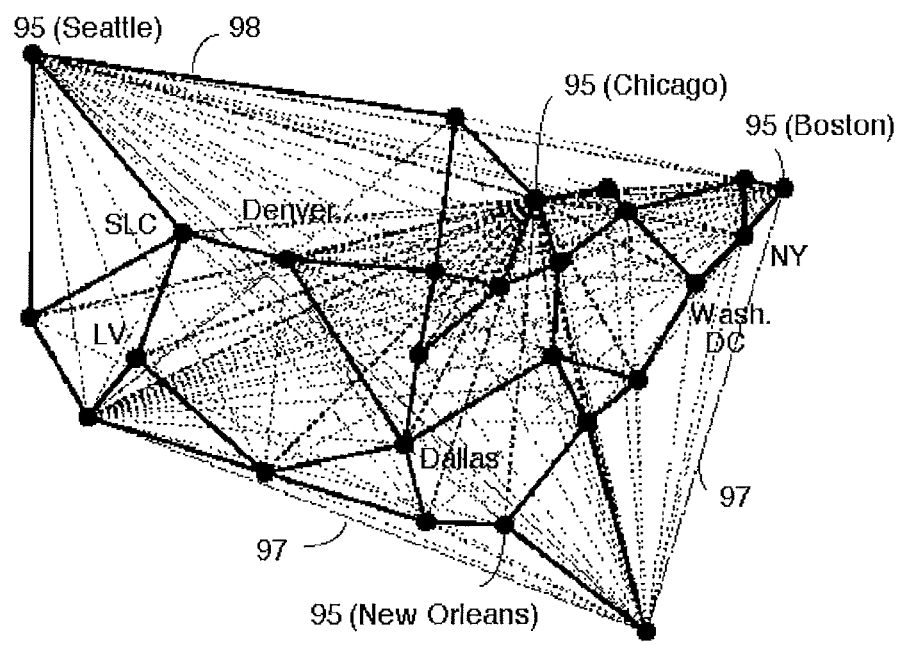
FIG. 2B. USA network with DVN from Chicago

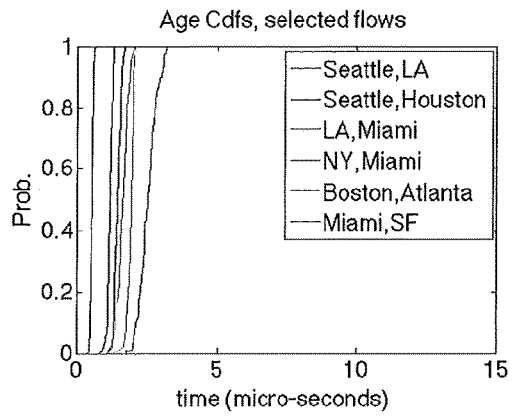
FIG. 3A: Queuing delay (age).
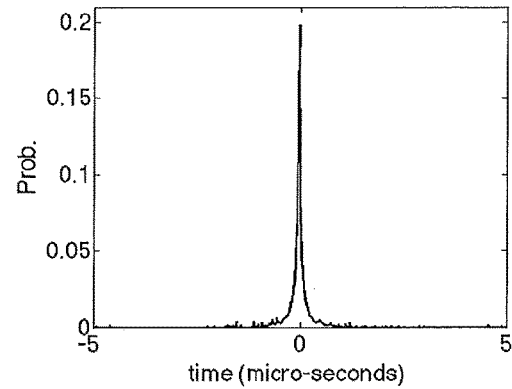
FIG. 3B: Packet jitter.
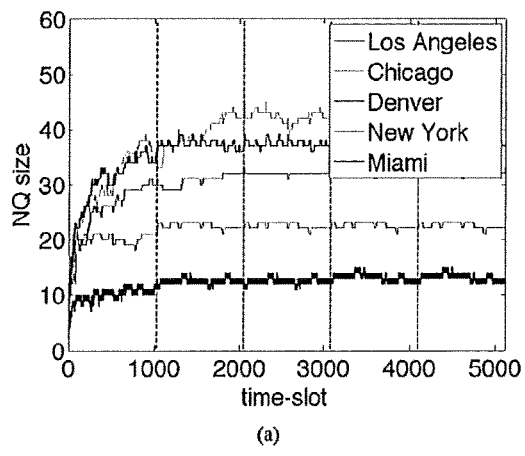
(a)
FIG. 3C. Queue sizes at selected cities.
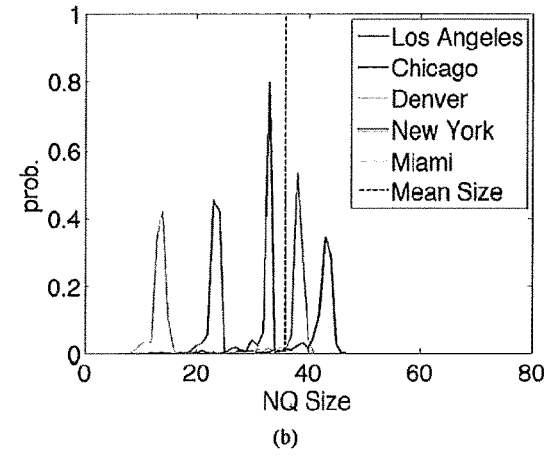
(b)
FIG. 3D. Queue size distribution.

802.3 Ethernet packet and frame structure

| Layer | Preamble | Start of frame delimiter | MAC destination | MAC source | 802.1Q tag (optional) | Ethertype (Ethernet II) or length (IEEE 802.3) | Payload | Frame check sequence (32-bit CRC) | Interpacket gap |
|---|---|---|---|---|---|---|---|---|---|
| | 7 octets | 1 octet | 6 octets | 6 octets | (4 octets) | 2 octets | 46(42)[b]–1500 octets | 4 octets | 12 octets |
| Layer 2 Ethernet frame | | | ← 64–1518(1522) octets → | | | | | | |
| Layer 1 Ethernet packet | | ← 72–1526(1530) octets → | | | | | | | |

FIG. 4A. Ethernet packet format.

IPv4 Header Format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | Flags | | | Fragment Offset | | | | | | | | | | | | |
| 8 | 64 | Time To Live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5) | | | | | | | | | | | | | | | | | | | | | | | | | | | | | | | |

FIG. 4B. IPv4 Packet header (4 bytes wide).

Fixed header format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | Traffic Class | | | | | | | | Flow Label | | | | | | | | | | | | | | | | | | | |
| 4 | 32 | Payload Length | | | | | | | | | | | | | | | | Next Header | | | | | | | | Hop Limit | | | | | | | |
| 8 | 64 | Source Address | | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | Destination Address | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

FIG. 4C. IPv6 Fixed Packet header (4 bytes wide)

| LABEL IN | LABEL OUT | OUTPUT PORT | DATA RATE | ACTION |
|---|---|---|---|---|
| 1 | 103 | 1 | 45 | C (512) |
| 2 | - | - | - | - |
| 3 | 32 | 2 | 25 | 0 |
| ⋮ | | | | |
| 512 | 103 | 1 | 70 | C (1) |
| ⋮ | | | | |
| 1023 | - | - | - | - |
| 1024 | 77 | 3 | 35 | 0 |
FIG. 5A. A Flow-Table.
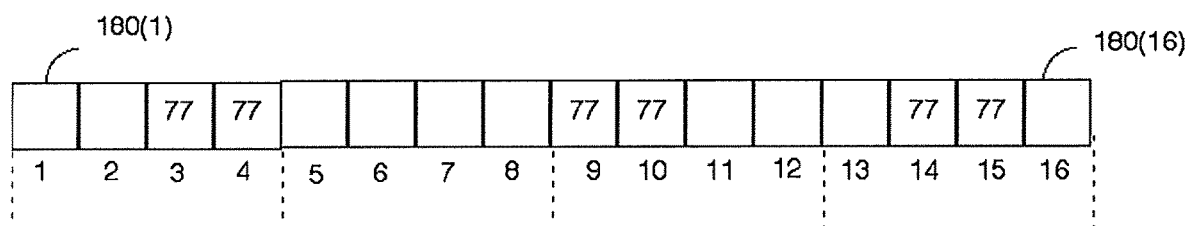
FIG. 5B. A scheduling frame.

1. Accept requests for a DTF (or DTFs) from sources over the Control-DVN.

2. Compute a fixed-path for each DTF, preferably using a 'Max-Flow-Min-Cost' routing algorithm.

3a. Determine for the distinct input port of every switch traversed by the DTF, a list of DTFs that arrive at said input port.

3b. Determine for the distinct output port of every switch traversed by the DTF, a list of DTFs that depart from said output port.

3c. Determine a matrix $D^S$ for every switch traversed by the DTF, where $D^S(J,K)$ represents the guaranteed data-rate requirement between input port J and output port K, for $1 <= J <= N$, $1 <= K <= M$.

4. For each CIOQ switch traversed by the DTF(s), and for each input port of said switch, compute a first deterministic forwarding-schedule for said input port, that identifies which of the M queues, if any, of said input port has a reservation to forward a packet to an output port, in each time-slot of a scheduling frame. Compute a second deterministic forwarding schedule, that identifies which DTF (or alternatively, the flow-queue or class-queue within said queue), if any, which has a reservation to forward a packet, in each time-slot of a scheduling frame.

5. For the XQ and CIOQ switches traversed by the DTF(s), and for each output port of said switch, compute a first deterministic TX-schedule for said output port, that identifies which of the N queues, if any, associated with said output port has a reservation to transmit in each time-slot of a scheduling frame. Compute a second deterministic TX-schedule, that identifies which DTF (or alternatively, which of the flow-queues or class-queues, if any, within said queue) has a reservation to transmit, in each time-slot of a scheduling frame.

6. Compute a first RX-schedule for each input port of each switch traversed by the DTF(s), based upon the TX-schedules determined earlier. The first RX-schedule identifies which queue, of the M queues associated with said input port, has a reservation to receive data in each time-slot of a scheduling frame.

7. Compute a second RX-schedule for each input port of each switch traversed by the DTF, based upon the TX-schedules determined earlier. The second RX-schedule identifies which DTF (or alternatively, the flow-queue or class-queue within said queue), has a reservation to receive data in each time-slot of a scheduling frame.

8. Compute a Flow-Table for each switch traversed by the DTF(s), which identifies for each input port of said switch, (a) the incoming flow-label of each DTF which arrives at said input port, (b) the output port used by said DTF, (c) the outgoing flow-label used by said DTF, (d) the guaranteed-rate of said DTF, and (e) optionally other information for the packet header, such as the IP-addresses, and the ports, and the protocol version.

FIG. 6A. Flow-Chart for SDN Control-plane.

9. Determine the security level and private key length for each DTF. A logarithmic security scale of 0 to 10 can be used. Level 0 implies no extra security, while level 10 implies exceptional security with very long keys.

10. Determine how many permutations will be used in the encryption/decryption process (the default is 0). Compute the private XOR key(s), the permutation key(s), and the inverse permutation key(s) for each DTF, to satisfy the security requirement.

11. Assign a secret DTF-AUTHORIZATION key to each DTF, with the appropriate key length. This key is a secret number which is embedded in every packet sent by the DTF (before the packet is encrypted), to verify that the DTF and the packet are authorized. The key is valaidated whenever the packet is decrypted. For security level 0, no key is assigned. For a low security level, a key may contain 16 or 32 bits. For modest security, a secret key may contain a few hundred bits. For very high securty, a key may approach or exceed a thousand bits.

12. If a DTC's packets are to be decrypted in a switch to access the flow-label in the packet header, then compute a third deterministic periodic RX-schedule for the distinct input port of every switch traversed by the DTF. The third RX-schedule identifies the time-slots in which an encrypted packet should be decrypted, at said distinct input port, for every time-slot in the scheudling frame. Compute a third deterministic periodic TX-schedule for the distinct output port of every switch traversed by the DTF. The third TX-schedule identifies the time-slots in which an unencrypted packet should be encrypted, at said distinct output port, for every time-slot in the scheduling frame. (Alternatively, the control-plane can identify the DTFs to be decrypted and encrypted in the flow-table for said switch, and the switch can process the flow-table for every time-slot in a scheduling frame to determine if decryption and encryption should occur.)

13. Transmit the private TX-schedules, the RX-schedules, the flow-table, and the encryption/decryption keys (the XOR key(s), the permutation key(s), and the inverse permutation key(s)) to each switch traversed by the DTF(s). The master-controller in each switch can assign the information to the appropriate input and output ports. Transmit the encryption and decryption keys to the source node and destnation node of each DTF..

FIG. 6B. Flow-Chart for SDN Control-plane.

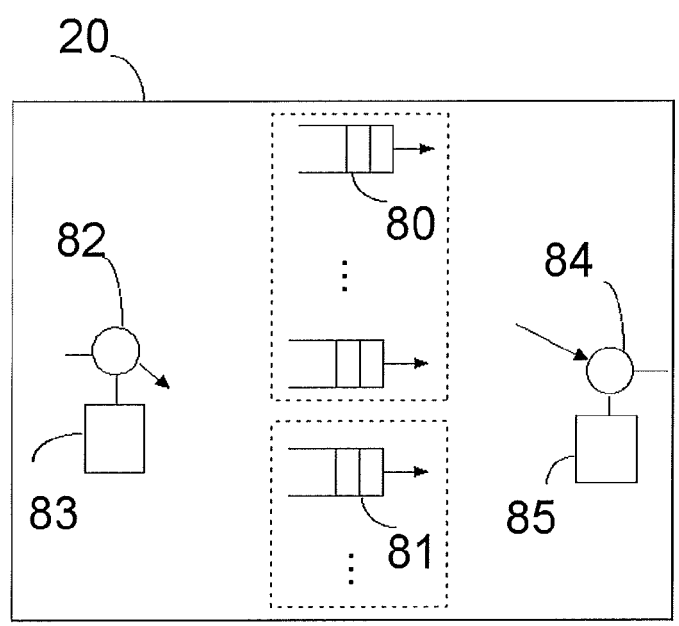
FIG. 7. A queue, partitioned into flow-queues and class-queues

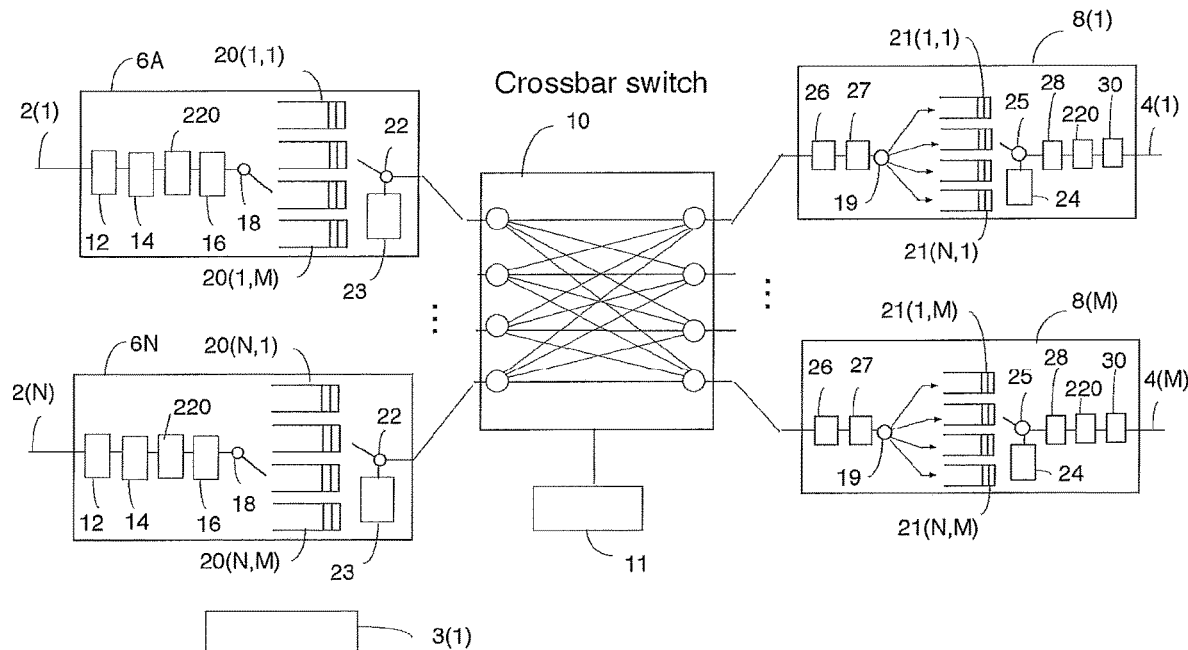
FIG. 8A. CIOQ Switch.
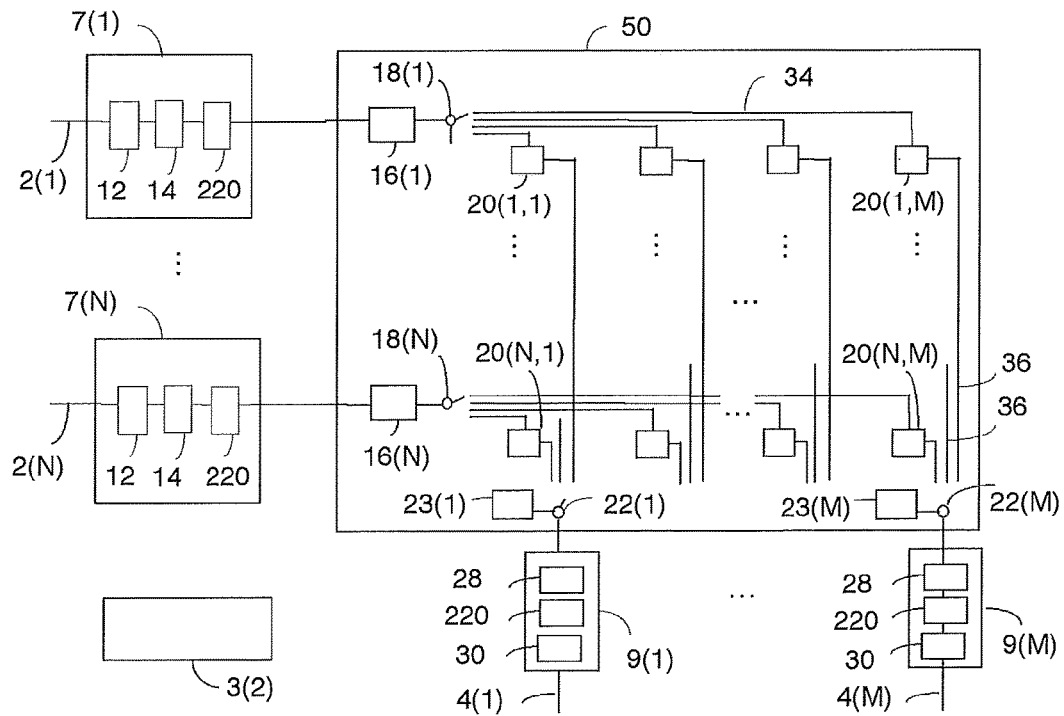
FIG. 8B. XQ Switch.

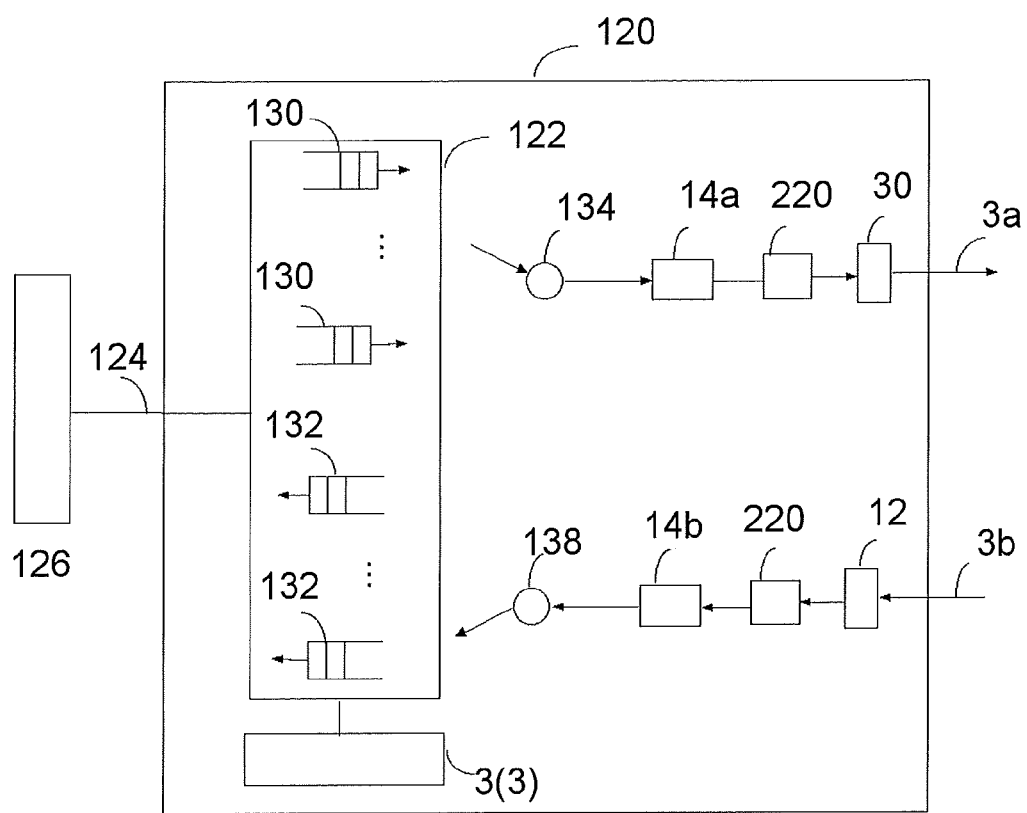
FIG. 9. A Guaranteed-Rate Transceiver.

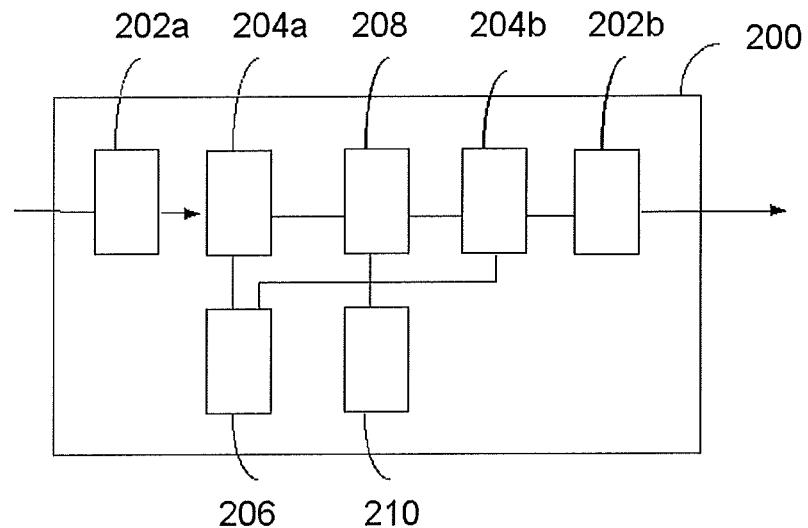
FIG. 10A : A parallel encryption unit.
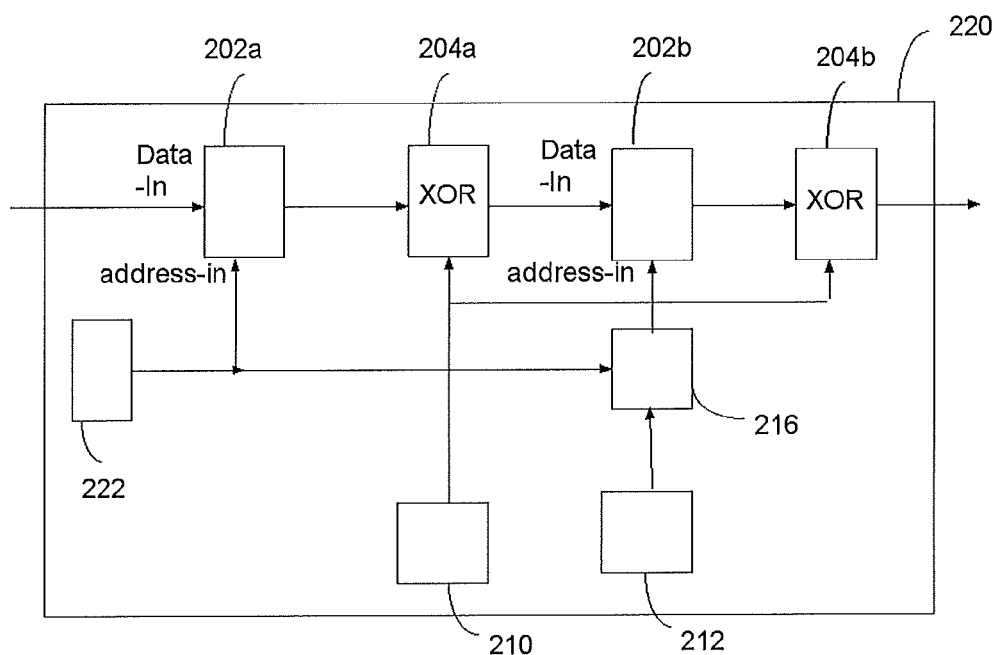
FIG. 10B. A serial encryption unit.

METHODS TO STRENGTHEN CYBER-SECURITY AND PRIVACY IN A DETERMINISTIC INTERNET OF THINGS

CROSS-REFERENCE TO RELATED APPLICATIONS

This application is a continuation of U.S. patent application Ser. No. 17/234,627, the 371 (c) date of which is Apr. 19, 2021, which is a continuation of U.S. patent application Ser. No. 16/075,402, filed on Aug. 3, 2018, entitled "METHODS TO STRENGTHEN CYBER-SECURITY AND PRIVACY IN A DETERMINISTIC INTERNET OF THINGS", which is a national filing of PCT International Application No. PCT/CA2017/050129, filed on Feb. 3, 2017, which claims the benefit of the filing date of U.S. provisional application No. 62/290,712, filed on Feb. 3, 2016, the entire contents of which are incorporated by reference herein.

FIELD

The present disclosure relates generally to communications networks, devices and methods, and more particularly to security and privacy of the Internet network, data center networks and other forms of networks.

In embodiments, the methods and designs describe a reduced-complexity Software-Defined-Networking controller, to control a deterministic network of many simple deterministic packet switches. The deterministic network can deliver a deterministic (or guaranteed-rate) of service to many traffic flows, with exceptionally low latencies, with up to 100% utilization, with improved energy efficiency, and with improved security. The methods and designs can be used in conjunction with Internet Protocol (IP) IPv4 and IPV6 networks, MPLS networks, optical networks, and 4G and 5G wireless networks, and radio-access-networks.

BACKGROUND

Articles Incorporated by Reference

The following documents are hereby incorporated by reference. These documents may be referred to by their title or by their numeric value.

1. T H. Szymanski, "Securing the Industrial-Tactile Internet of Things with Deterministic Silicon-Photonics Switches", IEEE Access Magazine, Vol. 4, September 2016, pp. 8236-8249.
2. T H. Szymanski, "Supporting Consumer Services in a Deterministic Industrial Internet Core Network", IEEE Communications Magazine, June 2016, Vol. 54, No. 6, pp. 110-117.
3. T H. Szymanski, "An Ultra-Low Latency Guaranteed-Rate Internet for Cloud Services", IEEE/ACM Transactions on Networking, February 2016, Vol. 4, No. 1, pp. 123-136.
4. J. Granjal J, E. Monteiro, J S Silva, "Security for the internet of things: a survey of existing protocols and open research issues", IEEE Communications Surveys & Tutorials, August 2015, 17(3), pp. 1294-312.
5. S L. Keoh, S S. Kumar, H. Tschofenig, "Securing the internet of things: A standardization perspective", IEEE Internet of Things Journal, 214 June 2014, 1(3), pp. 265-75.
6. M. Dabbagh, B. Hamdaoui, M. Guizani, A. Rayes, "Software-defined networking security: pros and cons", IEEE Communications Magazine, June 2015, 53(6), pp. 73-79.
7. K. Moriarty et al, IETF Request For Comments 8017, "PKCS #1: RSA Cryptography Specifications version 2.2.", November 2016
8. US FIPSP Standard NF, "Announcing the advanced encryption standard (AES)", US Federal Information Processing Standards Publication, Nov. 26, 2001, No. 197, pp. 1-51.
9. J. Borghoff, A. Canteaut, T. Güneysu, E B. Kavun, M. Knezevic, L R. Knudsen, G. Leander, V. Nikov, C. Paar, C. Rechberger, P. Rombouts. "PRINCE-a low-latency block cipher for pervasive computing applications", Int. Conf. on the Theory and Application of Cryptology and Information Security. Dec. 2 2012, pp. 208-225, Springer Berlin Heidelberg.
10. S. Even, Y. Mansour, "A construction of a cipher from a single pseudorandom permutation", Int. Conf. on the Theory and Application of Cryptology, Nov. 11, 1991, pp. 210-224, Springer Berlin Heidelberg.
11. A. Bogdanov, L R. Knudsen, G. Leander, F X. Standaert, J. Steinberger, E. Tischhauser, "Key-alternating ciphers in a provable setting: encryption using a small number of public permutations", In Annual Int. Conf. on the Theory and Applications of Cryptographic Techniques 2012 Apr. 15 (pp. 45-62). Springer Berlin Heidelberg.
12. S. Chen, J. Steinberger, "Tight security bounds for key-alternating ciphers", Annual Int. Conf. on the Theory and Applications of Cryptographic Techniques, May 11, 2014, pp. 327-350, Springer Berlin Heidelberg.
13. Y. Wang Y, Y. Ha, "FPGA-based 40.9-Gbits/s masked AES with area optimization for storage area network", IEEE Trans. on Circuits and Systems II: Express Briefs, January 2013, 60(1), pp. 36-40.
14. T H. Szymanski, "Method to achieve bounded buffer sizes and quality of service guarantees in the internet network", U.S. Pat. No. 8,665,722, Mar. 4 2014.
15. T H. Szymanski, "Crossbar Switch and Recursive Scheduling", U.S. Pat. No. 8,503,440, Aug. 6, 2013.
16. T H. Szymanski, "Method to schedule multiple traffic flows through packet-switched routers with near-minimal queue sizes", U.S. Pat. No. 8,681,609, Mar. 25 2014.
17. T H. Szymanski. "Delay and jitter limited wireless mesh network scheduling". U.S. Pat. No. 8,619,566, Dec. 31, 2013
18. T H. Szymanski. "Method and apparatus to schedule packets through a crossbar switch with delay guarantees", U.S. Pat. No. 8,089,959, Jan. 3, 2012
19. T H. Szymanski, Patent Application, "A Reduced Complexity Integrated Guaranteed Rate Optical Packet Switch", International Appl. Number CA2016051182, Package File Number 92154-16T, Oct. 7, 2016

BACKGROUND

The existing 'Internet of Things' (IOT) is a 'Best-Effort' (BE) network. Today's BE-IoT suffers from congestion, excessive delays, excessive costs, excessive energy use, and poor cyber-security. The BE-IoT provides only 'Best-Effort' (BE) service for consumers with no guarantees on the bandwidth, delay or jitter of a consumer's Internet connection(s). Today's BE-IoT has several fundamental problems that cause its poor performance and security: (1) Any traffic source can send data at any rate to any destination; (2) There is no inherent 'admission control'; (3) There is no inherent 'rate-control'; and (4) The path a packet takes through a network can change frequently. As a result of these problems, congestion and excessive delays can occur frequently. These problems are described in references [1], [2] and [3].

Consider a best-effort traffic flow in today's BE-IoT, between a source node and a destination node. The packets of this best-effort traffic flow do not need to follow a fixed path between the source and destination nodes. The packets may pass through several unregulated middle-boxes, which may perform functions such as load-balancing and network-address-translation. These middle-boxes may re-route the packets and change the packet headers. A middle-box which is compromised by a cyber-attacker can even deliver critical information to a cyber-attacker. The packets may be delivered out of order. Packets may encounter congestion and be dropped, and may never be delivered at all. The security problems of middle-boxes are described in [1].

In view of its poor performance, the BE-IoT is also typically over-provisioned to operate at light loads to reduce delays, jitters and packet loss rates. With over-provisioning, each link in a BE-IoT network operates at a fraction of its peak capacity, typically less than 50%. This over-provisioning is estimated to cost service-providers globally about $37 Billion US per year, in excess capital costs and energy costs, and excessive delays still occur frequently during times of congestion. The cost of over-provisioning is described in [2] and [3].

The BE-IoT also has poor security and privacy. It suffers from 'Denial-of-Service' (DOS) attacks, and offers no defense against targeted cyber-attacks. In a DOS attack, an Internet server is overwhelmed with traffic from many compromised traffic sources, causing it to fail. In a targeted cyber-attack, a cyber-attacker can compromise an Internet server, for example a bank server, and gain access to the confidential financial records of millions of users. The weak security of the Internet is described in [1], [4] and [5]. Existing encryption schemes for the IoT include the RSA encryption scheme described in [7], and the 'Advanced Encryption Standard' (AES) described in [8]. These schemes have drawbacks, which will become apparent in the following discussions.

As a result of congestion and DOS attacks, the BE-IoT cannot support the demanding low-latency 'Machine-to-Machine' (M2M) communications required in the robotic factories and in the critical infra-structure systems of the future, such as the Smart Power Grid, or the national energy pipeline grid. Furthermore, there is growing concern about the potential ability of Quantum computers to break existing encryption schemes such as RSA and AES in the next decade. Data will reside on disks and in data-centers for decades, and it is desirable to have an encryption scheme which can have shorter keys (a few hundred bits) and also exceptionally long keys (thousands of bits), to provide protection against Quantum computers. An efficient and secure system to manage the encryption keys is therefore needed.

In this patent application, methods and designs to add exceptional cyber-security and privacy to a proposed deterministic Internet of Things (IOT) network are presented. The proposed deterministic IoT consists of a network of simple 'Deterministic Packet Switches' (DPSs), which are controlled by a reduced-complexity 'Software Defined Networking' (SDN) control-plane. The network supports 'Deterministic Traffic Flows' (DTFs), where each DTF has a source node, a destination node, a fixed path through the network, and a deterministic or guaranteed rate of transmission. (A layer-3 Internet network should also support traditional best-effort traffic flows, to remain compatible with the legacy Best-Effort technologies.) Each DTF is immune to congestion and interference from other traffic flows. Each DTF is immune to DOS attacks, since each DTF receives a guaranteed rate of transmission.

The SDN control-plane proposed in this document can embed millions of 'Deterministic Virtual Networks' (DVNs) into the deterministic IoT, in layer 2 or in layer 3. These DVNs are deterministic; they are immune to interference, congestion and DOS attacks. These DVNs offer exceptional security and privacy. Even a single unauthorized packet transmission can be detected quickly, and hence no cyber-attacker can inject packets to break into remote computing systems. An Internet control-system, such a control-system for the future 'Smart Power Grid', can reserve its own congestion-free and interference-free DVN to manage its resources, with exceptional cyber-security. A cloud service provider, such as Netflix or Google, can reserve its own congestion-free and interference-free DVN to manage its resources, with exceptional cyber-security. A government can deploy an Internet-based control system, such as a 'Smart Healthcare System', with its own congestion-free and interference-free DVN to manage its sensitive healthcare information, with exceptional cyber-security. In fact, a DVN can be created to contain all of today's existing Best-Effort traffic into one DVN, to provide separation between legacy best-effort traffic and new deterministic traffic, and to facilitate the adoption of a deterministic IoT.

The proposed SDN control-plane can manage the encryption and transmission of large amounts of data very efficiently and securely. Consider a data center which stores hundreds of terabits of sensitive data. This data must be encrypted when it is stored, decrypted when it is used, and encrypted when it is transmitted to another data center to create a backup copy. The proposed SDN control-plane and proposed encryption scheme can encrypt and decrypt such large amounts of data very efficiently and securely. Consider a large cloud computing system running over tens of thousands of processors, distributed over many data centers around the globe. The cloud computing system must transmit large amounts of data between data centers, in an efficient and secure manner. The proposed SDN control-plane and proposed encryption scheme can encrypt and decrypt such large amounts of data very efficiently and securely.

According to a 2016 report by the US 'National Academy of Engineering', achieving exceptional cyber-security is one of 14 'Grand Challenge' problems for the 21st century. Fundamentally new approaches to security are required to address the security problems. In this document, a fundamentally new approach to security and privacy is introduced. It is shown that the combination of (i) deterministic communications, (ii) centralized control using a low-complexity SDN control-plane to manage security and privacy, and (iii) a new lightweight encryption unit, can achieve exceptional performance, security and privacy, well beyond what is possible with today's Best-Effort networks.

A 'Field Programmable Gate Array' (FPGA) is a type of integrated circuit, where the functionality can be programmed in the field. In contrast, an 'Application Specific Integrated Circuit' (ASIC) is an integrated circuit designed for 1 specific function. A state-of-the-art FPGA today typically has about 10 million simple programmable logic gates (i.e., 2-input NAND gates), about 100 Megabits of high-speed memory, and can reach clock-rates of about 400 MHz. Using today's design techniques, a typical BE-IoT router has buffers for a fraction of second of data, to provide congestion control for worst-case scenarios. Using existing design techniques, a typical router with 4 Terabits per second (Tbps) of bandwidth and with buffers for $1/10$ of a second of data will require buffers for about 400 Gigabits of data, equivalent to about 33.3 million maximum-size IPv4 packets (with about 1500 bytes each). Clearly, it would impossible to synthesize a 4. Tbps deterministic packet switch into a single FPGA or ASIC using today's design techniques, due to the vast amount of buffering required.

FPGAs will soon be integrated with Silicon-Photonics electrical-to-optical converters, and optical-to-electrical converters, which reside on a single integrated circuit package. Recently, high-capacity 'Silicon-Photonics' (SP) transceivers for Ethernet have become commercially viable, from companies such as MELLANOX, LUXTERA, IBM and INTEL. These transceivers have very high data-rates, so it becomes increasing important to minimize buffer sizes in networks such as the IoT, data center networks, and storage area networks.

The deterministic packet switches described in this patent application can reduce buffer sizes by a factors of between 1000 and 1 million times, compared to a Best-Effort Internet router. Experimental results show that a deterministic packet switch can buffer at most a few hundred packets per switch, and often much less. Therefore, by using the methods and design techniques proposed in this document, it will be possible to integrate the proposed simple deterministic packet switches, which are controlled by a reduced-complexity SDN control-plane, into a single FPGA or ASIC. This document will also present low-complexity encryption and decryption schemes, which also can be realized on a single FPGA or ASIC integrated circuit.

SUMMARY

In accordance with one aspect, the design and methods for a reduced-complexity SDN control-plane are disclosed, which can control a proposed deterministic network of simple deterministic packet switches to achieve exceptional performance and security, are presented. The SDN control-plane will control access to the bandwidth of every transmission link in the deterministic network, by providing deterministic schedules to each deterministic packet switch. Even a single un-authorized packet transmission can be detected. The SDN control-plane will also manage the security and privacy level of each deterministic traffic flows, by managing the encryption keys used for each deterministic transport connection.

In accordance with another aspect, the design of a reduced-complexity 'lightweight' private-key encryption scheme is disclosed, which can process terabits of data per second with low hardware cost and low energy use, is presented. This scheme makes use of a low-cost serial permutation unit. This encryption scheme can be used to encrypt large amounts of data very quickly and with exceptional security. For example, the entire contents of a computer system or data-center can be encrypted quickly and efficiently. Using this design, data can be encrypted quickly and efficiently before it is written to a disk or transmitted onto a network, and it can be decrypted quickly and efficiently when it is read from a disk or received from a network.

In accordance with another aspect of the invention, methods and designs for the combination of (i) a deterministic network, (ii) a reduced-complexity SDN control-plane to manage encryption keys, and (iii) a low-cost private-key encryption scheme, to achieve exceptional performance and security in layer 3, the Internet layer, are presented.

In accordance with another aspect of the invention, methods and designs for the combination of (i) a deterministic network, (ii) a reduced-complexity SDN control-plane to manage encryption keys, and (iii) a low-cost private-key encryption scheme, to achieve exceptional deterministic performance and security in layer 2, the Data Link Layer, are presented.

In accordance with another aspect of the invention, the design of deterministic packet switches which incorporate the proposed reduced-complexity 'lightweight' private-key encryption and decryption schemes, are presented.

BRIEF DESCRIPTION OF THE DRAWINGS

FIG. 1A illustrates a network of packet-switches and routers, which can operate in layers 2 or layers 3. FIG. 1B illustrates several 'Deterministic Traffic Flows' (DTFs) in layers 2 and layers 3.

FIG. 2A illustrates a proposed deterministic Internet of Things network arranged in a USA topology. FIG. 2B illustrates a 'Deterministic Virtual Network' (DVN) embedded into the IoT. The DVN has a DTF from Chicago to every other city in the network.

FIGS. 3A-3D illustrate the experimental results of the proposed deterministic IoT. FIG. 3A illustrates the queuing delay distribution along several DTFs in the USA network. FIG. 3B illustrates the jitter distribution averaged over all DTFs in the USA network. FIG. 3C illustrates the evolution of the number of packets buffered in a city, for selected cities in the USA network. FIG. 3D illustrates the distribution of the number of packets buffered in a city, for selected cities.

FIGS. 4A-4C illustrate various packet formats. FIG. 4A illustrates the packet format of an Ethernet packet. FIG. 4B illustrates the packet header of an Internet Protocol version 4 (IPv4) packet. FIG. 4C illustrates the packet-header of an IPV6 packet.

FIG. 5A illustrates a Flow-Table. FIG. 5B illustrates a scheduling frame.

FIG. 6A and FIG. 6B illustrates a Flow-Chart for the reduced-complexity SDN control-plane.

FIG. 7 illustrates a queue, which is partitioned into smaller flow-queues and class-queues, to provide a finer level of control for individual DTFs and for classes of traffic.

FIGS. 8A-8B illustrate two types of switch designs, which may be used in the deterministic Internet network, deterministic data center networks, and other deterministic networks. FIG. 8A illustrates a CIOQ switch. FIG. 8B illustrates a XQ switch.

FIG. 9 illustrates a proposed Guaranteed-Rate transceiver, which can communicate with the proposed SDN control-plane to achieve exceptional security.

FIG. 10A illustrates a high-cost parallel encryption unit. FIG. 10B illustrates a low-cost serial encryption unit.

DETAILED DESCRIPTION

Packet switches are used in Internet routers which are interconnected at layer 3, the 'Network Layer' layer, which is also called the 'Internet' layer. Layer 3 performs the routing of packets and flows. In today's BE-IoT, the path a packet takes through a network is determined by each router and each middle-box that it traverses in layer 3. The path a packet takes can be changed by a router or a middle-box. Each router or middle-box typically extracts the packet destination from the packet header, and accesses a routing-table (using the destination as an index into the table) to identify an outgoing port to receive the packet.

Packet switches are also used in networks which operate in layer 2, also called the 'Data Link' layer. Layer 2 switches technically do not perform routing. They can forward packets along paths which have been determined by a network administrator. Layer 2 networks such as Ethernet networks typically use broadcasting, to avoid the need to perform any routing functions. Each packet transmission is typically broadcasted to all destinations on the network, and only the desired destination accepts the packet for further processing.

In FIG. 1A, many packet-switches or Internet routers 95 can be interconnected with directed transmission links 98 to form a network. In a layer 3 Internet network, the links 98 may transmit packets such as IPv4 or IPv6 packets. The links 98 typically transmit packets over fiber-optic transmission lines. The network may support many end-to-end traffic flows, each from a source node 93 to a destination node 99 in the network. In the BE-IOT, the path taken by a best-effort traffic flow from a source node to a destination node may change frequently, due to the use of middle-boxes which perform load-balancing. In contrast, in the proposed future deterministic IoT an end-to-end DTF will follow a fixed path from the source 93 to the destination 99. The edges 98a, 98b and 98c form one fixed path from the source to the destination. The edges 98d, 98e and 98f form a second fixed path from the source to the destination. In a deterministic IoT, the traffic from a source to a destination can also be split over a few fixed paths, to provide protection from the failure of any one path. (We use the number 95 to denote both internet routers in layer 3 which contain packet switches, and packet switches in layer 2).

Software Defined Networking (SDN) refers to a type of network where a logical control-plane 110 (also called an SDN control-plane) exists, to control the switches or routers 95 in a network. The SDN control-plane can control each switch or router 95, typically by sending control packets over the network to each switch with control commands. The SDN control-plane 110 can exist as a single software entity at one location or data-center, or it can be distributed over multiple locations or data-centers. The SDN control-plane will typically transmit control packets into the network from one source node, using a Public key encryption algorithm such as RSA. The control packets contain control information and can be used to configure each packet switch.

A Public key encryption algorithm such as RSA requires 2 keys to secure a connection to a destination, a Public key which is publically available, and a Private key which only the destination knows. In the RSA Public key scheme, a source can encrypt a packet to a destination using its known Public key, and only the destination can decrypt the packet using its secret Private key. Public key encryption algorithms are typically complex and slow. They are often used in the Internet to transfer a secret Private key between 2 entities. There after, the 2 entities can communicate much more efficiently using their secret private key (or keys), using a Private key encryption scheme. In the proposed deterministic IoT, the proposed SDN control-plane can use a Public key encryption scheme such as RSA, to communicate with the deterministic packet switches. The security of RSA can be made very high by using very long keys, at the expense of increased computation time and energy. In the proposed deterministic IoT, the SDN control-plane can to use the RSA encryption scheme to provide communicating users with very long Private keys, to achieve very secure communications with very low energy use. The RSA scheme is described in document [7]. (The SDN control-plane can also use the Private key encryption scheme proposed in this document, once the private keys have been assigned, since it is more efficient.)

The proposed SDN control-plane can create millions of distinct DVNs in layer 3 or in layer 2. Each DVN is a collection of DTFs. The DTFs in a DVN are immune to congestion and DOS attacks, since they use deterministic communications. All DVNs are non-interfering, which improves performance and security.

The Internet Engineering Task Force (IETF) is developing standards for security in today's Internet of Things, as described in [2]. According to [2], the IETF is focusing on low-power devices with small encryption keys to be used in today's Best-Effort IoT; It is not considering fundamentally new approaches, such as SDN control-planes to manage security in deterministic networks, and it is not considering Private key encryption with very long keys. It is not addressing emerging problems like encrypting the contents of a data center to be transmitted over the IoT. One of the primary advantages of an SDN control-plane is that it allows network administrators the freedom to choose their own network control policies and encryption schemes using the latest technologies, without being constrained to adhere to standards developed by the IETF or other organizations. SDN control-planes are discussed in [6].

FIG. 1B illustrates 'Deterministic Traffic Flows' or DTFs 97. DTFs 97 are also called 'Virtual Links' (VLs). The proposed SDN control-plane can create DTFs in a layer-3 network using IoT routers, provided that the IoT routers are modified to include the inventions described in this document. The proposed SDN control-plane can also create DTFs 97 in a layer-2 network using low-complexity deterministic packet switches. In this document, designs of low-complexity deterministic packet switches which can be used in layer 2 and in layer 3 are described.

FIG. 2A illustrates a deterministic IoT network arranged in a USA topology. Each city has a deterministic packet switch 95. The switches 95 are interconnected by edges 98 (bold lines), which represent fiber-optic transmission lines. Several DTFs 97 are illustrated with the dotted lines. The city Seattle has a DTF to every other city. The cities Los Angeles (LA), Miami and New York (NY) each have a DTF to every other city.

FIG. 2B illustrates the USA deterministic IoT network, with one embedded 'Deterministic Virtual Network' (DVN). The DVN consists of many DTFs 97 (shown by the dotted lines), from the city Chicago to every other city. The DVN has been configured and established by the SDN control-plane 110 (not shown in FIG. 2B).

In accordance with one aspect of this disclosure, the proposed SDN control-plane can embed many DVNs into the proposed deterministic IoT operating in layer 3, and can create DTFs between Internet routers in layer 3. The Internet routers in layer 3 can then forward traffic of many different DVNs, along with the traditional Best-Effort Internet traffic flows. This approach will facilitate the adoption of deterministic technologies, since any improvement to the IoT must support legacy Best-Effort traffic flows which will not disappear quickly.

In accordance with another aspect of this disclosure, the proposed SDN control-plane can embed many DVNs and DTFs into the proposed deterministic IoT operating in layer 2, between simple deterministic packet switches. The deterministic packet switches in layer 2 can encapsulate IPv4 and IPV6 packets into a new packet format for layer 2. The deterministic packet switches in layer 2 could transport packets with a maximum size determined by the SDN control-plane. For example, the maximum size of packets in layer 2 may be assigned any value, such as 8K bytes, 16 Kbytes, or 64 Kbytes. Larger packets can be more efficient to transmit optically. Each packet in layer 2 may therefore contain several smaller IPv4 or IPv6 packets, or each packet in layer 2 may also contain a fraction of a very large IPv6 packet.

A software simulator was developed to verify the correct operation and performance of the deterministic IoT network as shown in FIG. 2A. All links were operated at heavy loads, with an average of 93% link utilization. FIG. 3A illustrates the queuing delay CDF (cumulative distribution function) along several DTFs in the USA network topology of FIG. 2A. We assume the optical links have a rate of 400 Gigabits per second (Gbps), and a maximum-size packet has 1,500 bytes. A time-slot has sufficient time to transmit a maximum-size packet, and the duration of a time-slot is therefore about 30 nanoseconds, and the duration of a scheduling frame with 1024 time-slots is about 30 microseconds. The queuing delays between cities are less than 2 microseconds, an extreme low delay. The delay of the fiber between 2 cities such as Miami and Seattle will exceed 20 milliseconds, so the queuing delay within the deterministic packet-switches is over 1,000 times smaller than the fiber delay.

FIG. 3B illustrates the average packet jitter over the USA topology, which is exceptionally small. The average jitter is less than 1 microsecond. FIG. 3C illustrates the evolution of the number of packets buffered per switch (called the 'Node Queue' size), starting from an empty switch, versus time. (A node is also called a switch.) The number of packets buffered in a node reaches a steady-state deterministic pattern after about 3000 time-slots. The largest node queue buffers less than 50 packets in this experiment. Recall that in a BE-IoT, a router can buffer millions of packets. FIG. 3D illustrates the distribution of the number of packets queued in a node, in steady state, for selected cities. All nodes buffer less than 50 packets in this experiment, which can be between 1000 and 1 million times less buffering than used in a typical BE-IoT router using today's design techniques.

FIG. 4 illustrates 3 different packet formats. Packets can have many formats, such as Ethernet, Infiniband, Fiber-Channel, MPLS, IPv4 or IPv6 packet formats. FIG. 4A illustrates an Ethernet packet. The source and destination are identified with a 6 byte MAC (media access control) address. FIG. 4B illustrates the header of an IPV4 packet. The source and destination are identified with a 32-bit Internet Protocol (IP) address. FIG. 4C illustrates the header of an IPv6 packet. The source and destination are identified with a 128-bit IPv6 address. An IPV6 packet also includes a 24-bit 'flow-label' in its header. The flow-label is an alternative means to identify a traffic flow between 2 nodes in IPV6. IPv6 can use a scheme called 'Label-Swapping', where each traffic flow can be assigned a unique flow-label on each link it traverses. This scheme allows for the identification of 2^24 (about 16 million) unique traffic flows on each link.

The IEE has recently approved a 'Deterministic Ethernet' standard. In this standard, the basic Ethernet packet has been expanded to include a 24-bit 'Virtual Network' label. This label allows for the specification of about 16 Million Virtual Networks, on one broadcast-based Ethernet network. Unfortunately, this standard does not use 'flow-labels' (described ahead), which limits its usefulness in large networks with packet switches. For our deterministic network, a preferred layer 2 packet format would include a field to identify a virtual network with 24 . . . 32 bits, a field to identify a flow-label with 24 . . . 32 bits, and it could support larger packet sizes, i.e., 4 Kbytes, 8 Kbytes or 16 Kbytes.

Flow-Labels

A 'best-effort traffic-flow' in today's Best-Effort Internet network typically represents the best-effort traffic flowing between 2 application programs running on 2 computers. The computers can be in the same city or in different cities. A best-effort traffic flow in today's Best-Effort Internet is typically identified by examining 5 fields in the packet header, a source Internet-Protocol (IP) address and port number, a destination IP address and port number, and a protocol identifier. Each traffic-flow can be identified by extracting these 5 fields from an IPV4 or IPv6 packet header. The 5 fields can occupy many bits, typically 104 bits (32+16+32+16+8=104 bits) in an IPv4 network.

To simplify the process to identify a traffic flow, a 'Flow-Label' can be inserted into the packet headers, to identify the flows with less processing. As shown in FIG. 3C, IPv6 packets have a 24-bit Flow-Label in the packet headers, which can uniquely identify up to about 16 Million traffic-flows.

IPv6 routers can use a technique called 'label-swapping', to increase the number of flows which can be identified. In this scheme, each flow is assigned a unique flow-label for every link it traverses. At each switch, an incoming flow has an incoming flow-label, and the outgoing flow has an outgoing flow-label, and these may differ. The switch or router will assign a new unique outgoing flow-label to each incoming packet of a traffic flow, and it will maintain a Flow-Table to record the mapping between incoming flow-labels and outgoing flow-labels. In this manner, the entire network can have billions of flows which can be uniquely identified. The proposed deterministic packet switches can also operate in this mode, using flow-labels and label-swapping, to maintain compatibility with existing technologies. Label-swapping is also used in MPLS networks.

FIG. 5A illustrates a flow-table. Each flow-label (from 1 . . . 1024) may have a row in the table. If the flow-label is active, the table will identify an outgoing flow-label (between 1 and 1024). An active flow-label will have a non-zero guaranteed data-rate (expressed for example in Megabits per second, or in time-slot reservations per scheduling frame). An active flow-label is assigned to an output port of the switch. The last column specifies an action for the switch to perform, where 0 implies no special action, and C implies that flows are to be combined (or aggregated). In FIG. 5A, the incoming flow with label 1 is combined with the incoming flow with label 512, and both are assigned a new outgoing label with the value 103 on output port 1.

One advantage of using flow-labels is that multiple DTFs can be combined or aggregated, into a single DTF at one location before transmission. The aggregated DTF can be de-aggregated or split back into the constituent DTFs at another location. In this manner, many deterministic traffic flows can be aggregated before transmission over longer distances. For example, in FIG. 2B many lower rate DTFs which originate at one city (i.e., New York) and which are to be deliver at another city (i.e., Los Angeles) can be combined into one aggregated DTF in New York, transmitted as one higher-rate DTF, and they can be de-aggregated at Los Angeles. The use of flow-labels can reduce the complexity of the proposed deterministic packet switches, so that they manage a relatively small number of aggregated flows, rather than potentially millions of un-aggregated flows.

Other information relevant to a DTF can also be stored in the flow-table. A row may include: (i) the number of the DVN which contains the DTF, (ii) the source and destination IP addresses, and (iii) the IP port numbers. This data can be used to validate a packet when it is decrypted. In addition, a new security scheme can also be implemented, where the SDN control-plane provides every authorized DTF with a unique secret key called the DTF-AUTHORIZATION key when it is established. The flow-table can also store the DTF-AUTHORIZATION key for each DTF. (Please see the flow-chart in FIG. 6 ahead.)

A Flow-Chart for the SDN Control-Plane

FIG. 6A and FIG. 6B illustrate a flow-chart for the proposed reduced-complexity SDN control-plane. Traditional SDN control-planes apply to traditional best-effort networks and are described in reference [3], entitled "Software-defined networking security: pros and cons". IEEE Communications Magazine, June 2015. A traditional SDN control-plane can contain thousands of rules, which are stored in a very large memory. Traditional SDN rules specify how to process packet headers to identify traffic flows, and what to do with a packet once it is identified. A typical best-effort switch may store up to 10,000 rules, which may be insufficient to handle all traffic flows. In this case, additional rules for a switch are stored in the SDN control-plane. A switch which encounters a packet for which its has no rules must contact the SDN control-plane, and wait for rules to be downloaded to the switch. Clearly, the existence of thousands of rules which specify how to process packets represents a significant complexity and performance cost for traditional SDN control-planes. In addition, traditional SDN networks are designed for traditional best-effort networks, which use thousands of rules to define their actions.

The proposed reduced-complexity SDN control plane controls access to the bandwidth of every transmission link in the deterministic network, and it controls the many simple deterministic packet switches in the network. The deterministic packet switches do not have thousands of rules to govern their behaviour. The behaviour of a deterministic packet switch is simple and embedded in deterministic hardware, which cannot be compromised by a cyber-attacker. In this document, each deterministic switch can identify a deterministic traffic flow using several methods. (a) by using the flow-label of the DTF. (b) by identifying the distinct 'flow-queue' which buffers packets for the DTF (as described ahead), or (c) by using a unique identifier assigned by the SDN control-plane, such as the DTF-AUTHORIZATION key described ahead. Each deterministic switch may forwards packets according to deterministic schedule(s) under the control of the proposed SDN control-plane (as described ahead).

In line 1 of box 170, the SDN control-plane processes a request for one DTF (or several DTFs) from traffic sources or network administrators. Each DTF has a source, a destination, a guaranteed data-rate, and a security level. In line 2, the SDN control-plane can compute a fixed path for the DTF from the source to the destination, which meets the DTF's guaranteed data-rate requirement, using for example 'Maximum Flow Minimum Cost' routing algorithm. Once each DTF has been assigned a fixed path, the traffic flowing between the input ports and output ports of each switch traversed by the DTF is determined. In line 3a, the control-pane will determine, for the distinct input port of every switch traversed by the DTF, a list of DTFs that arrive at said input port. In line 3b, the control-plane will determine, for the distinct output port of every switch traversed by the DTF, a list of DTFs that depart on said output port. In line 3c, the SDN control-plane may determine an N*M traffic demand matrix, denoted DAS, for each switch S traversed by the DTF. Matrix element DAS(J,K) indicates the guaranteed data-rate required between input port J and output port K of said switch S (for $1<=J<=N$, and $1<=K<=M$). Some scheduling methods may require such a matrix. (In line 4, the SDN control-plane can compute deterministic forwarding-schedules associated with each input port K of each CIOQ switch S traversed by a DTF. The function of these schedules will become apparent later.)

In line 5, the SDN control-plane can compute deterministic transmission-schedules (TX-schedules) associated with each output port K of each switch S traversed by the DTF. The first TX-schedule specifies which queue, selected from a set of N queues associated with the output port K of the switch, can transmit data on said output port K and its associated transmission line, for each time-slot of a scheduling frame with F time-slots. (A queue can buffer packets for several DTFs, and it may contain several flow-queues, where each flow-queue buffers the packets of a distinct DTF. In this discussion, a queue has a guaranteed rate of reception and transmission, and a flow-queue has a guaranteed rate of reception and transmission.) A second TX-schedule can be computed which identifies which DTF (or class of traffic) has a reservation to transmit data on said output port and its associated transmission line, for each time-slot of the scheduling frame. (To identify a DTF, the second TX-schedule could identify the flow-label of the DTF, or it can identify the flow-queue within said queue, which buffers packets for said DTF. Each DTF is assigned to a distinct flow-queue within a queue, so identifying the flow-queue will identify the DTF Similarly, a class of traffic can also use a flow-label for identification, or a pointer or index to select the distinct class-queue within the queue. A class-queue can also have a guaranteed rate of reception and transmission.) The 2 TX-schedules can also be replaced by one schedule, the second TX-schedule which identifies the DTF (or class of traffic). In this case, the switch may use extra hardware to identify the queue to remove a packet from. For maximum speed, 2 TX-schedules can be used although only 1 is necessary.

Transmission links can have different scheduling frame lengths F, which can be any positive integer. When F is a power of 2, the scheduling can be simplified, since recursion can be used as described in [15]. For example, some transmission links may use F=1024 time-slots, and some may use F=8096 times. The SDN control-plane will reserve a sufficient number of time-slots for the transmission of each DTF (or class of traffic) on each transmission link, to meet its guaranteed data-rate requirement. The SDN control-plane will thereby control access to all the bandwidth on every transmission link in the deterministic network, thereby providing exceptional cyber-security. Even a single un-authorized packet transmission can be detected quickly, since it will violate one of the deterministic schedules.

The TX-schedules associated with an output port of a switch define which DTFs (or classes of traffic) have a reservation to transmit over that output port and onto the associated transmission line, for every time-slot in the scheduling frame. These TX-schedules automatically define which DTFs (or classes of traffic) have a reservation to arrive over a transmission line at a receiving input port at a receiving deterministic packet switch, for every time-slot in the scheduling frame. Therefore, the TX-schedules for the output port of one transmitting switch will define the reception-schedules (RX-schedules) for one input port of another receiving switch. In line 6, the control-plane will compute a first RX-schedule, which can identify which output port an arriving packet will use, for each time-slot in a scheduling frame. The output port will identify the queue to receive the packet. The queue can buffer packets for many DTFs (or classes of traffic). In line 7, the control-place can compute a second RX-schedule, which can identify the DTF (or class of traffic) which has a reservation to arrive on each time-slot of a scheduling frame. (To identify a DTF, the second RX-schedule could identify the flow-label of the DTF, or it can identify the flow-queue within said queue, which buffers packets for said DTF. Each DTF is assigned to a distinct flow-queue within a queue, so identifying the flow-queue will identify the DTF. Similarly, a class of traffic can also use a flow-label for identification, or a pointer or index to select the distinct class-queue within the queue.) The 2 RX-schedules can be replaced by one schedule, the 2nd RX-schedule. In this case, each input port may access a flow-table to determine the output port (and therefore the queue) to receive the packet, which takes time. For maximum speed, 2 RX-schedules can be used although only 1 is necessary.)

In line 8, the control-plane can determine the flow-table for each switch traversed by the DTF(s). The flow-table can identify: (a) the incoming flow-label of each DTF (or class of traffic) which arrives at the switch. (b) the output port used by the DTF (or class of traffic), (c) the outgoing flow-label used by the DTF (or class of traffic), (d) the guaranteed rate of the incoming DTF (or class of traffic), and optionally other information from the packet header, such as the source and destination IP addresses, the ports, the protocol number, etc. If a DTF-AUTHORIZATION key is used (as described ahead), it is also stored in the flow-table. (The flow-table may exist in one memory in a switch, or it may be partitioned into several memories, depending upon the implementation.)

In line 9, the SDN control-plane determines the security level for the DTF. A logarithmic scale from 0 to 10 can be used, where level 0 denotes no extra security effort. A moderate security level can use private key lengths with between 128 and 256 bits, to be comparable to today's typical encryption schemes such as AES [8], which use keys with between 128 and 256 bits. To achieve exceptional security, he private keys can have lengths of one thousand bits or more. These keys are managed by the SDN control-plane, so the use of very long keys poses no burden to the end-users. In line 10, the private encryption keys are computed for each DTF. These private keys can include one or more pseudo-random XOR keys, one or more keys representing pseudo-random permutations, and one or more keys representing inverse permutations (these keys are described ahead). An inverse permutation key can be easily computed in a deterministic packet switch from a permutation key, and visa-versa, so the SDN control-plane does not need to send both the permutation key and its inverse. (The encryption/decryption unit is described ahead.)

In line 11, the control-plane may assign a secret pseudo-random DTF-AUTHORIZATION key to each DTF when it is initialized. This secret key will be contained within each packet transmitted by the DTF, before it is encrypted. The key is validated whenever the packet is decrypted, at a DPS or at the destination node of the DTF. The key length can vary from 0 bits for security level 0, or 16 or 32 bits for a low security level, or a few hundred bits for high security, and potentially 1000 bits or more for a high security level.

In line 12, the control-plane may compute a third TX-schedule and a third RX-schedule for the distinct input port and the distinct output port of each switch traversed by the DTF. The packets of a DTF may be decrypted at a switch, to read a flow-label from the packet-header which is used to access the flow-table. For example, when 2 DTFs are aggregated in a switch, their flow-labels will change and the packet must be decrypted for this to happen. The third RX-schedule will identify, for the distinct input ports traversed by the DTF, the time-slots in which an arriving encrypted packet should be decrypted, for each time-slot in a scheduling frame. Similarly, the third TX-schedule will identify, for the distinct output ports traversed by the DTF, the time-slots in which a decrypted packet should be encrypted before departure, for each time-slot in a scheduling frame.

In line 13, the SDN control-plane transmits the TX-schedules to each switch traversed by the DTF, using a Control-DVN (described ahead) which uses a Public key or private key encryption scheme. It also transmits the RX-schedules to each switch traversed by the DTF using the Control-DVN. It also transmits the private encryption keys to the source of each DTF, and the private decryption keys to the destination of each DTF, over the Control-DVN. (The source and destination may be a Guaranteed-Rate Transceiver (described ahead), or it may be a deterministic packet switch.) At each switch, a master-controller will forward the schedules to the proper input port controller/memory or output port controller/memory.

The flow-chart can be modified to process requests for a single DTF, or for several DTFs, by one with ordinary skill in the art. It can be modified to remove one DTF or several DTFs. It can be modified to adjust the transmission rate assigned to an existing DTF or to several DTFs. It can be modified to process requests for many DTFs at once, and it may generate schedules for every input port and every output port of every switch in the network simultaneously, to configure the entire network at once.

Packet-Switch Designs

Internet Protocol packets have variable sizes. IPv4 packets typically vary in size from about 64 to about 1500 bytes. A packet switch in layer 3 can be designed to operate in 2 modes. In the first mode, called the VARIABLE-SIZE mode, a packet switch may transmit variable-size IPv4 or IPv6 packets from the input ports to the output ports of a switch. This approach typically increases the complexity and cost of a packet switch, and small packets can be delayed by large packets. In the second mode, called a FIXED-SIZE mode, a packet switch may fragment each incoming IPv4 and IPV6 packet into smaller fixed-sized cells with typically between 64 and 256 bytes at each input port, and it may re-assemble the variable-size IPv4 or IPv6 packet from the cells at each output port. This approach typically simplifies the switch design and complexity. In the following discussion, we assume that the layer 3 switches operate in the second mode, to simplify the design.

In a layer 2 switch, the use of large fixed sized packets can be preferable for long distance transmissions, to simplify the switch design and complexity and to improve transmission efficiency. A maximum size layer 2 packet may have any fixed size, such as 4K bytes, 16K bytes or 64 Kbytes. In this document, we assume packets with at most 8K bytes are transmitted in layer 2. A layer 2 packet can therefore encapsulate several smaller IPv4 or IPv6 packets, as described earlier.

Low-Jitter Scheduling

It is preferable for the deterministic schedule to have a 'low-jitter' property, so that the number of packets buffered in a queue is minimized, as described in [3]. Consider a DTF which reserves time-slots for the transmission of R fixed-sized packets in a scheduling frame with F time-slots. For each DTF, let each maximum-sized packet transmission require P consecutive time-slot reservations, where the value P can be selected for each DTF. A DTF transporting video may choose large packets with a large P, while a DTF transporting voice may choose smaller packets with a small P. In FIG. 5B, a DTF reserves time-slots for 3 packet transmissions, each requiring 2 time-slots, in a scheduling frame with 16 time-slots. The reserved time-slots are labeled 77.

The packet transmissions therefore reserve R*P time-slots for transmission, leaving F−R*P time-slots idle. In FIG. 5B, 6 time-slots are reserved for transmissions, and 10 time-slots remain idle. The transmission of R packets implies that there are R idle-periods, with one idle period following each packet transmission. (An idle period may wrap around from the end of the schedule back to the beginning of the schedule and up to the transmission time of the firsts packet.) To minimize the packet jitter, the number of idle time-slots between packet transmissions should be relatively equal. Therefore, the R idle-periods between packet transmission should each contain approximately (F−R*P)/R time-slots each. In FIG. 5B, there are 3 idle periods, the idle period with time-slots (5,6,7,8), the idle period with time-slots (11,12,13), and the idle period with time-slots (16,1,2). The sizes of these idle periods are roughly equal, within an allowable jitter.

In a perfect low-jitter schedule, each idle period will contain exactly (F−R*P)/R time-slots, However, it may not be possible to compute a perfect low-jitter schedule in reasonable time, or at all. In reference [3], it is shown that the perfect low-jitter scheduling problem can be NP-Hard, and it can take an exponential amount of computing time to find a minimum jitter schedule. In practice, a schedule with reasonably low packet jitter can be used. Therefore, the R idle-periods should contain between (F−R*P)/R−Z time-slots and (F−R*P)/R+Z time-slots each, where Z represents an allowable jitter, where Z is a positive integer. A smaller value of Z will reduce the average number of packets buffered in a queue. According to our experiments and theory in [3], a value Z<=4*P will keep the queue sizes reasonably small, and a value of Z<=2*P will allow for near-minimal queue-sizes.

A good low-jitter schedule for a queue will exhibit this property P1. (P1) The number of time-slot reservations for transmission from the queue will be relatively equal in each half of the scheduling frame. For example, if a queue has T time-slot reservations for transmission per scheduling frame with F time-slots, then in each half of the scheduling frame with F/2 consecutive time-slots, the number of time-slot reservations for the queue should be approximately T/2. Since the problem of computing perfect low-jitter schedules in NP-Hard, in practice each half of the scheduling frame should contain between T/2−Y time-slot reservations and T/2+Y time-slot reservations, where Y is a positive integer which represents an allowable jitter. A smaller value of Y will reduce the average number of packets buffered in a queue. In FIG. 5B, the first half of the schedule has 2 time-slot reservations, and the 2nd half of the schedule has 4 time-slot reservations, which is roughly equal within an allowable jitter.

For a very low jitter schedule, the value Y should not exceed 2*P. For a moderately low jitter schedule, the value Y should not exceed 4*P. For a schedule with moderate jitter, the value Y can be related to the value R, i.e., Y=maximum (4*P, R/10). The same criterion for a good low-jitter schedule can be applied recursively. A good low-jitter schedule for a queue will also exhibit this property P2. (P2) Let a scheduling frame with F time-slots be sub-divided into K equal size subsets, each with F/K consecutive time-slots (where F/K can be a real-number). The number of time-slot reservations for transmission from the queue in each subset will be relatively equal. For example, if a queue has T time-slot reservations for transmission per scheduling frame, then in each of the K subsets of the scheduling frame with F/K consecutive time-slots, the number of time-slot reservations for the queue should be approximately T/K. In FIG. 5B, the 4 quarters of the scheduling frame contain (2, 0, 2, 2) time-slots reservations, which are approximately equal within an allowable jitter.

Since the problem of computing perfect low-jitter schedules can be NP-Hard, in practice each subset should contain between T/K−Y time-slot reservations and T/K+Y time-slot reservations, where Y is a positive integer which represents an allowable jitter. A smaller value of Y will reduce the average number of packets buffered in a queue. According to our experiments in [3], for a very low jitter schedule, let Y<=2*P, and for a moderately low jitter schedule, let Y<=4*P. If we allow each queue to buffer about 20% of a DTF's guaranteed-rate of T, the value Y can be related to the value T, i.e., let Y=maximum (4*P, T/10).

Finally, the above bounds apply when P=1, i.e., each packet transmission takes 1 time-slot.

Supporting Traffic Flows and Traffic Classes

A deterministic network may support multiple traffic classes, where each link 98 in FIG. 1 can optionally transmit packets belonging to multiple traffic classes. For example, the IETF's Differentiated Services traffic model supports 3 prioritized traffic classes, called 'Expedited Forwarding' (EF) class, the 'Assured Forwarding' AF class, and the Default (DE) class. A new class can be added to support Deterministic traffic flows, which can be called the DET or GR class. A new class can also be added to support Best-Effort traffic flows, which can be called the BE class, where each flow in the class receives best-effort service with no per-flow data-rate guarantees.

FIG. 7 illustrates a queue 20. Let queue 20 have a guaranteed data-rate for reception and transmission (determined by the SDN control-plane). In accordance with one aspect of this disclosure, a queue 20 can be further partitioned into several flow-queues 80 and several class-queues 81. A queue 20 can potentially buffer many different DTFs and many classes of traffic, for example the 3 DiffServ traffic classes, EF, AF, DE, a new deterministic traffic class, and a Best-Effort (BE) traffic class. Hence, in accordance with one aspect of this disclosure, a queue 20 can logically consist of several smaller flow-queues 80 and class-queues 81. Let the flow-queues 80 and class-queues 81 each have a guaranteed data-rate for reception and transmission (determined by the SDN control-plane).

When a queue 20 receives service, this service should be allocated to the flow-queues 80 and class-queues 81 according to their deterministic data-rate requirements. The SDN control-plane can compute a first deterministic periodic schedule to identify the time-slots when queue 20 has a reservation to receive a packet within a scheduling frame. The SDN control-plane can also compute a second deterministic schedule, which identifies which flow-queue 80 or class-queue 81 within queue 20, if any, has a reservation to receive a packet in each time-slot of a scheduling frame. These two schedules can be stored in memories in a controller 83. The controller 83 can control a de-multiplexer 82, to write a packet into the correct flow-queue 80 or class-queue 81. Similarly, the SDN control-plane can compute a third deterministic periodic schedule to identify the time-slots when the queue 20 has a reservation to transmit a packet within a scheduling frame. The SDN control-plane can also compute a fourth deterministic schedule, which identifies which flow-queue 80 or class-queue 81 within queue 20, if any, has a reservation to transmit a packet in each time-slot of a scheduling frame. These schedules can be computed by the SDN control-plane for each queue 20 in a deterministic packet switch, and stored in memories in a controller 85, and re-used as long as the traffic rates do not change. Preferably, these schedules are low-jitter schedules, to minimize the queue size. Methods to compute low-jitter schedules are described in the paper [3] by T H. Szymanski, entitled "An Ultra-Low-Latency Guaranteed-rate Internet for Cloud Services", IEEE Trans, on Networking, February 2016.

Two types of deterministic packet switches are considered next, switches with combined input and output queues, and switches with crosspoint queues. The preferred embodiment is the switch with crosspoint queues, with tends to be easier to control.

A Switch with Combined Input and Output Queues (CIOQ Switch)

FIG. 8A illustrates a switch with 'Combined Input and Output Queues', called a CIOQ switch. A typical CIOQ packet-switch has N input fibers 2. M output fibers 4. N input ports (IPs) 6, M output ports (OPs) 8, and an unbuffered crossbar switch 10 to provide connections between the input ports 6 and output ports 8. The switch also has a master-controller 3, which can control all the other controllers within the switch. The master-controller 3(1) can receive and decrypt packets from the SDN control-plane 110, and can encrypt and send packets to the SDN control-plane 110 (using wires which are not shown in FIG. 8A). The master-controller 3(1) may receive deterministic schedules and encryption/decryption keys from the SDN control-plane, which are used to configure the switch.

In FIG. 8A, the N×M CIOQ switch has N×M input queues 20, where each input queue 20 is associated with an input port 6 and an output port 8. Each input queue $20(j,k)$ is associated with one input port $6(j)$ and one output port $8(k)$, for $1<=j<=N$, and $1<=k<=M$. The input queue $20(j,k)$ stores packets (or cells or data) which are received at input port $6j$, and which will be transmitted at output port k. Similarly, the N×M CIOQ switch has N×M output queues 21, where each output queue $21(j,k)$ is associated with one input port $6j$ and one output port $8k$. The output queue $21(j,k)$ stores packets (or cells or data) which are received at input port j, and which will be transmitted at output port k, for $1<=j<=N$, and $1<=k<=M$. Hence, each input port is associated with M input queues, and each output port is associated with N output queues.

Each input port 6 contains an optical-to-electrical converter 12, a buffer 14 to store an incoming packet, a controllable encryption/decryption unit 220, a controller 16, a de-multiplexer 18, and M input queues 20, to buffer packets. In practice, the M input queues 20 within one input port can reside in one logical queue within one memory module, which is partitioned into M smaller input queues 20 by using pointers to memory. Each input port 6 also has a multiplexer 22, to select an input queue 20 to service, and a controller 23 to control this multiplexer.

In the existing BE-IoT using IPv4, the controller 16 will extract routing information from an IPv4 packet header, and access a routing-table (not shown) to determine the correct output port 8 and output queue 21 to receive the packet. In an IPV6 network that uses flow-labels, the controller 16 will extract the flow-label from the IPV6 packet header, and access a flow-table (shown in FIG. 5A) to determine the correct output port to receive the packet. The flow-table will direct each flow to one output port 8, i.e., each flow is associated with one input queue 20 and one output queue 21. The flow-table is a lookup table to translate the incoming flow-label to a desired output port 8, to identify the output port (and therefore the input queue 20) to receive the packet or data. The flow-table may also contain a new outgoing flow-label, which overwrites the incoming flow-label. The SDN control-plane can configure the flow-table memory. The flow-table memory may be organized as a linear lookup table where each flow-table occupies one row, as shown in FIG. 5A, or a Content-Addressable Memory, or as a Cache, to provide fast memory access. When flow-labels are read from a packet header, the decryption/encryption unit 220 will decrypt the packet, to provide access to its packet header. The encryption/decryption unit 220 may use a controller and memory (not shown) to store a third deterministic RX-schedule, to identify the time-slots in which arriving packets should be decrypted, as described in the flow-chart of FIG. 6.

The crossbar switch 10 may have no speedup, i.e. S=1, and it can deliver at most 1 packet to each output port 8 at any one time. The crossbar switch 10 can also have a small limited speedup of S>1, where S is a small number such as 2 or 4 typically. A switch with a speedup of S>1 can deliver at most S packets to each output port 8 at any one time. For the lowest cost and complexity, a crossbar switch 10 can deliver at most 1 packet to each output port in each time-slot. The crossbar switch may have a controller and memory 11 to store a pre-computed deterministic periodic schedule of switch configurations, where each switch configuration specifies the connections to be made between the input ports 6 and output ports 8, for each time-slot of a scheduling frame. The SDN control-plane can configure this controller and memory 11, or the packet switch can configure this controller and memory 11 under the control of the SDN control-plane.

Each output port 8 has a buffer 26 to store a packet to transmit, a controller 27 to control a de-multiplexer 19, M output queues 21, a multiplexer 25 to select an output queue 21 to service, a controller 24 to control the multiplexer 25, a buffer 28 to buffer a packet to transmit, a controllable decryption/encryption unit 220, an electrical-to-optical transmitter 30, and an outgoing fiber 4. The decryption/encryption unit 220 can contain a controller with memory (not shown) to store a deterministic third TX-schedule, initialized by the SDN control-plane, which instructs it when to encrypt a packet and when to pass a packet through unchanged, as described in the flow-chart of FIG. 6B.

For a deterministic CIOQ switch, 2 deterministic RX-schedules can be computed to control each input port, as described in the flow-chart. In each input port 6, the controller 16 can use a first deterministic periodic RX-schedule, to identify which input queue 20 has a reservation to receive an incoming packet (or cell or data), based upon the time-slot in a scheduling frame. If deterministic service guarantees are to be provided to individual traffic flows and traffic classes, then at each input port 6, the controller 16 can use a second deterministic periodic RX-schedule, to identify flow-queue 80 or class-queue 81, within an input queue 20, which has a reservation to receive an incoming packet (or cell or data), based upon the time-slot in a scheduling frame. When a packet is transmitted from an input port to an output port, the index of the input port (from 1 to N) can be used to control the de-multiplexer 18, to direct the packet to the proper output queue.

If the packet of a DTF is to be decrypted to access the flow-label, a controller (not shown) can control the decryption/encryption unit 220, to decrypt the packet. The controller has memory to receive a third deterministic RX-schedule from master-controller (and SDN control-plane), to identify the time-slots in which a packet should be decrypted, for each time-slot in a scheduling frame. The 2nd RX-schedule identifies the DTF, so the correct decryption keys can be used.

Similarly, for a deterministic CIOQ switch, 2 deterministic TX-schedules can be computed to control each output port, as described in the flow-chart in FIG. 6. In each output port 8, the controller 24 can use a first deterministic periodic TX-schedule, to identify which output queue 21 has a reservation to transmit a packet (or cell or data), based upon the time-slot in a scheduling frame. If deterministic service guarantees are to be provided to individual traffic flows and traffic classes, then at each output port 8, the controller 24 can use a second deterministic periodic TX-schedule, to identify the flow-queue 80 or class-queue 81 (not shown in FIG. 8A), within an output queue 21, which has a reservation to transmit a packet (or cell or data), based upon the time-slot in a scheduling frame.

If the packet is to be encrypted a controller (not shown) can control the decryption/encryption unit 220, to encrypt the packet. The controller can have a memory to store a third TX-schedule, which identifies the time-slots in which a packet should be encrypted, for each time-slot in the scheduling frame. The 2nd TX-schedule can identify the DTF, so the correct encryption keys can be used.

Methods to compute first low-jitter TX-schedules for a CIOQ switch are described in the document by T H. Szymanski, "Methods to Achieve Bounded Buffer Sizes and Quality of Service Guarantees in the Internet Network", U.S. Pat. No. 8,665,722, 2014, which has been incorporated by reference earlier. Additional methods are described in the document by T H. Szymanski, "Method and apparatus to schedule packets through a crossbar switch with delay guarantees". U.S. Pat. No. 8,089,959, 2012. These methods are also described in the document [3] by T H. Szymanski, "An Ultra-Low-Latency Guaranteed-rate Internet for Cloud Services", IEEE Trans. on Networking, February 2016.

Methods to determine the second low-jitter schedules for a CIOQ switch are described in the document by T H. Szymanski. "Method to schedule multiple traffic flows through packet-switched routers with near-minimal queue sizes", U.S. Pat. No. 8,681,609, 2014. These methods are also described in the document [3] by T H. Szymanski, "An Ultra-Low-Latency Guaranteed-rate Internet for Cloud Services", IEEE Trans. on Networking. February 2016.

A Crosspoint-Queued Switch

FIG. 8B illustrates a switch with 'Crosspoint Queues', also called a XQ switch. A XQ switch with size N×N is shown in FIG. 8B. A typical XQ packet-switch has N input fibers 2. M output fibers 4, N simple input ports 7, M simple output ports 9, and a buffered switch 50 with many queues, to provide a data pathway from the input ports 7 and output ports 9. The switch also has a master-controller 3(2), which can control all the other controllers within the switch. The master-controller can receive and decrypt packets from the SDN control-plane 110, and can encrypt and send packets to the SDN control-plane 110 (using wires which are not shown in FIG. 8B). The master-controller 3(2) may receive deterministic schedules and encryption/decryption keys from the SDN control-plane, which are used to configure the switch The input port 7 contains an electrical-to-optical converter 12, a buffer 14, and a decryption/encryption unit 220. The operation of these components has been described for the CIOQ switch in FIG. 8A.

Each input port 7 is associated with one row of the buffered switch 50, and each output port 9 is associated with one column of the switch 50. The buffered switch 50 has many crosspoint queues 20. (The queues 20 in FIG. 8A have effectively been moved into the switch 50.) Each input port 7 is connected to a controller 16 in one row of the switch 50, which controls a de-multiplexer 18 in the same row. Each de-multiplexer 18 is connected to M horizontal wires 34 which lead to the M queues 20 in one row. Each output port 9 receives a packet (or cell or data) from a multiplexer 22 in one column of the switch, which is controlled by a controller 23. The multiplexer 22 is connected to the queues 20 in a column, by several vertical wires 36.

For a deterministic XQ switch, 2 deterministic RX-schedules can be computed to control how data is forwarded in each row of the switch 50. The controller 16(j) is associated with each input port 7(j), for 1<=j<=N. The controller 16(j) can use a first deterministic periodic RX-schedule, to identify which crosspoint queue 20 in the row j has a reservation to receive an incoming packet (or cell or data), based upon the time-slot in a scheduling frame, as described in the flow-chart. If deterministic service guarantees are to be provided to individual DTFs and traffic classes, then the controller 16(j) can use a second deterministic periodic RX-schedule, to identify which flow-queue 80 or class-queue 81, within a crosspoint queue 20, has a reservation to receive an incoming packet (or cell or data), based upon the time-slot in a scheduling frame. (As described earlier, the second RX-schedule can also identify the DTF or class of traffic using a flow-label.)

If the packet of a DTF is to be decrypted to access the flow-label in the packet header, a controller (not shown) can control the decryption/encryption unit 220, to decrypt the packet. The controller has memory to receive a third deterministic RX-schedule from the SDN control-plane, to identify the time-slots in which a packet should be decrypted, for each time-slot in a scheduling frame. The 2nd RX-schedule can identify the DTF, so the correct decryption keys can be used.

Similarly, for a deterministic XQ switch, 2 deterministic TX-schedules can be computed to control how data is removed from each column for each output port 9. Each column k is associated with output port 9k, for 1<=k<=M. The controller 23(k) can use a first deterministic periodic TX-schedule, to identify which crosspoint queue 20 in the column k has a reservation to remove a packet (or cell or data), based upon the time-slot in a scheduling frame. If deterministic service guarantees are to be provided to individual DTFs and traffic classes, then the controller 23(k) can use a second deterministic periodic TX-schedule, to identify the flow-queue 80 or class-queue 81, within an crosspoint queue 20, which has a reservation to remove a packet (or cell or data), based upon the time-slot in a scheduling frame. The removed packet in column k, if any, is forwarded to the output port 9k.

If the packet is to be encrypted a controller (not shown) can control the decryption/encryption unit 220, to encrypt the packet. The controller can have a memory to store a third TX-schedule, which identifies the time-slots in which a packet should be encrypted, for each time-slot in the scheduling frame, as described in the flow-chart. The 2nd TX-schedule can identify the DTF, so the correct encryption keys can be used.

Methods to compute a first deterministic TX-schedule for an XQ switch are described in the document by T. H. Szymanski, "Crossbar Switch and Recursive Scheduling", U.S. Pat. No. 8,503,440, 2013, which has been incorporated by reference earlier. Methods which can be used to compute a second deterministic TX-schedule for the crosspoint queues 52
are described in the document by T. H. Szymanski, "Method to schedule multiple traffic flows through packet-switched routers with near-minimal queue sizes", U.S. Pat. No. 8,681,609, 2014. Additional methods are described in the document [3] by TH Szymanski, "An Ultra-Low-Latency Guaranteed-Rate Internet for Cloud Services", IEEE/ACM Trans. on Networking, February 2016, A Guaranteed-Rate Transceiver FIG. 9 illustrates a Guaranteed-Rate transceiver node 120, which can act as a source node 93 and a destination node 95 in the IoT. The node consists of a memory module 122, a computer system bus interface 124 from a computer system 126, and a master-controller 3(3). The computer system 126 can write data to transmit into the memory 122 over the bus interface 124, and it can read data which has been received and which resides in the memory 122 over the bus interface 124. The computer system 126 can write commands to control the transceiver into the master-controller 3(3), and it can receive signals (such as an interrupt signal to request intervention) from the master-controller 3(3) over the bus interface 124. Typically, a computer system has a 'Direct Memory Access' (DMA) system (not shown), which can be programmed to write larger amounts of data into the memory 122, and which can be programmed to receive larger amounts of data from the memory 122.

The memory 122 can be divided into separate transmit-queues (or TX-queues) 130, where each TX-queue 130 has data to transmit to one destination over a DTF in the network. The memory 122 can be divided into separate receive queues (or RX-queues) 132, where each RX-queue 132 has data which has been received from one destination over a DTF in the network.

A packet (or cell or data) to be transmitted on an outgoing fiber 3a is selected from a TX-queue 130 by a multiplexer 134, which is controlled by the master-controller 3(3). The packet is moved into a buffer 14a. The data can be encrypted in a decryption/encryption unit 220, converted to the optical domain by an electrical-to-optical converter 30, and transmitted over an outgoing fiber 3a.

A packet (or cell or data) which is received on an incoming fiber 3b is written to a RX-queue 132 by a RX-de-multiplexer 138, which is controlled by the master-controller 3(3). The packet is converted into an electrical signal in an optical-to-electrical converter 12. The packet can be decrypted in a decryption/encryption unit 220, written to a buffer 14b, and then written into an RX-queue 132 through the demultiplexer 138.

The master-controller 3(3) can send a message to the SDN control-plane 110 to request service, and it can receive a message from the SDN control-plane 110. (The master-controller 3(3) can use the Control-DVN described ahead to communicate with the SDN control-plane.) For example, the master-controller 3(3) can request a DTF to be established from its computing system 126 which is the source of data, to a remote computer system (not shown) which is the destination of the data, through the deterministic IoT network. The DTF will have a Guaranteed-Rate of transmission. The master-controller 3(3) can request a level of security for the DTF, as described in the flow-chart. The SDN control-plane 110 and the GR transceiver 120 allow for the security and privacy for each DTF to be selected from a wide range of security strengths, as described earlier.

If the request for a DTF is approved by the SDN control-plane 110, the master-controller 3(3) will receive a confirmation message from the control-plane. It may receive a flow-label to be used to identify the DTF. It will receive the encryption keys for the DTF. The encryption keys include one or more private XOR keys, and one or more permutation keys, as described in the flow-chart.

The master-controller 3(3) will receive a deterministic transmission-schedule (a TX-schedule), valid for a scheduling frame with F time-slots, which specifies which DTF has a reservation to transmit data, if any, in each time-slot of a scheduling frame, over the outgoing fiber 3a. The master-controller 3(3) may receive a deterministic reception-schedule (an RX-schedule), valid for a scheduling frame with F time-slots, which specifies which DTF has a reservation to receive data, in each time-slot of a scheduling frame, from the incoming fiber 3b. The master-controller 3(3) may receive a DTF-AUTHORIZATION key. This key is to be embedded in every packet transmitted in a DTF before encryption, as described in the flow-chart.

If the computer system 124 is the destination of a DTF, the GR transceiver will also receive configuration messages from the SDM control-plane, with the decryption keys, the RX-schedules, and the DTF-AUTHORIZATION key for said DTF. The GR transceiver can decrypt each packet as it is received, and verify that its DTF-AUTHORIZATION key contained within the packet is valid. Otherwise, an unauthorized packet arrival is detected, and the SDN control-plan is notified for corrective action.

Traditional Ethernet Transceivers

Traditional Ethernet transceivers do not communicate with an SDN control-plane 110, and they therefore cannot receive a TX-schedule to control their transmissions, or private encryption keys to control the security level. In many cases, a traditional best-effort Ethernet transceiver may be used to send data to a deterministic packet switch. The deterministic packet switch can then convert the best-effort traffic flow to a DTF, and act as the traffic source of a new DTF for this traffic flow. The DTF will adhere to deterministic schedules when it is transmitted to other packet switches. The deterministic packet switch can also perform the encryption for these packets. A deterministic packet switch must therefore be able to receive the packets of a best-effort traffic flow from a traditional Ethernet transceiver, which does not adhere to a TX-schedule. In this case, the traditional Ethernet transceiver should ensure that the number of time-slots used for the transmission of each traffic flow does not exceed the DTF's guaranteed rate of transmission, otherwise the receiving deterministic packet switch will detect an error (the violation of a DTF's guaranteed rate of transmission), and it will inform the SDN control-plane 110 for corrective action.

Secure SDN Control-Plane Using Long Private Keys

The SDN control-plane 110 is under the control of a trust-worthy network administrator. The SDN control-plane 110 can initially configure a first DVN to control the deterministic packet switches in the deterministic IoT. The functionality of the DPS is embedded into the switch hardware, by the deterministic schedules. If the DPSs are built using FPGAs, the deterministic hardware can be programmed once and permanently configured during the manufacturing process, or the FPGAs can be replaced by ASICs. The DPSs do not execute a software program which resides in Random Access Memory (RAM), and hence they cannot be 'broken into' or compromised and taken control of by a cyber-attacker. (If a micro-processor is used in a DPS, for example to decrypt RSA packets, then its program must be stored in 'Read-Only-Memory' (ROM) which cannot be re-written, so that it cannot be compromised by a cyber-attacker.)

The SDN Control-DVN

Assume that the deterministic IoT can use a 24-bit field to identify a DVN. Therefore, each DVN can have a unique identifying label ranging from 0 up to 16 Million. Let the first VN with label 0 be reserved for communications between the SDN control-plane and the DPSs. For example, FIG. 2B illustrates a DVN from Chicago to every other city. The behaviour of each DPS in response to packets received from the SDN control-plane on this special 'Control DVN' can be 'programmed into the deterministic hardware' the FPGA or ASIC. If a software-based processor is used to handle control messages, then its program should execute out of ROM which cannot be rewritten, so that it cannot be compromised by a cyber-attacker. A DPS must decrypt each message from the SDN control-plane, using a Public key or Private key encryption scheme.

This special 'Control-DVN' must have sufficient bandwidth to support the communications between by the SDN control-plane and all the DPSs, so that the schedules and keys can be updated periodically, for example when they are computed, or every minute, or every 15 minutes, or every hour, etc. For example, the SDN control-plane can update the schedules to each DPS periodically over the Control-DVN. In a layer-2 IoT, this communications happens 'below layer 3' and is performed in deterministic hardware, i.e., the 'Berkeley Socket layer' software package is not used to open and close sockets between processors, and the DPS do not run a software program located in RAM which can be compromised by a cyber-attacker.

The security of the SDN control plane can be improved by using a 'Triple Modular Redundancy' (TMR) voting system, to have 3 distinct control-planes and 3 Control-DVNs running in parallel. When using TMR, the 3 control-planes perform every function and a voting system is used to detect abnormal behaviour of any one control-plane. For example, with 3 Control-planes and 3 Control-DVNs running in parallel, a cyber-attacker could not compromise any one control-plane or Control-DVN without being detected. It would be very difficult for a cyber-attacker to compromise one Control-DVN at all, and it would be virtually impossible for a cyber-attacker to compromise 3 Control-DVNs simultaneously to avoid detection.

Encryption Schemes

A DVN can contain thousands of kilometers of fiber, and a cyber-attacker can potentially access the fiber to 'eavesdrop' on transmissions, or to inject false packet transmissions. To protect against this scenario, a deterministic IoT can be configured so that all packet transmissions on a DTC are encrypted. The Public-key encryption algorithms such as RSA are not well suited to encrypt terabits of data per second.

An FPGA or an ASIC integrated circuit has limited computational resources, so a simpler 'lightweight' encryption scheme is preferred. Assume a DTF transmits packets with a maximum size. A maximum-size of a packet can determined by the SDN control-plane. For the following illustrative example, let the maximum-size packet contain 8K bytes.

The following parallel encryption unit is based upon a scheme called 'XOR-PERMUTE-XOR' (XPX), which was proposed in document by Evan and Mansour, "A Construction of a cipher from a pseudo-random permutation", 1991.

This scheme requires 2 pseudo-random XOR keys and one key representing a pseudo-random permutation. Unfortunately, its cost is prohibitive.

A Parallel Encryption Unit

A parallel encryption unit 200 is shown in FIG. 10A. The unit has a first buffer 202a to buffer a packet to encrypt, and a second buffer 202b to buffer the encrypted packet. It has two XOR-units 204a and 204b, which are controlled by an XOR-controller 206. The encryption unit 200 also has a permutation unit 208 which is controlled by a permutation controller 210.

The XOR-unit 204 will perform a logical exclusive-or (XOR) operation between the packet and a private XOR key. If the packet is 8K bytes long, then the private XOR key can be 8K bytes long, and the logical XOR operation will require 8K exclusive-or logic gates. The XOR-controller 206 provides a first private XOR key to the XOR-box 204a, and it provides a second private XOR key to the XOR-box 204b.

The permutation unit 208 can permute the order of the bytes (or rows of bytes) in the packet. A hardware circuit to permute the order of 8K bytes can be constructed with many large parallel multiplexers, but it would be very costly. Let a packet with 8K bytes be arranged as a 2 dimensional L*W matrix, with L=1K rows with W=64 bits per row. The permutation unit can permute the order of the rows, using many large multiplexers operating in parallel. We will estimate the cost of this approach.

Each row to be in the permuted order can be selected from 1K rows, and will require a very large multiplexer with 1K input ports and 1 output port, where each port is 64 bits wide. Such a large multiplexer would require about 64 parallel 1K-to-1 binary multiplexers, for a total cost of about 64*1K=2^16 binary multiplexers (a binary multiplexer is a 2-to-1 multiplexer which selects 1 bit from 2 bits). Each binary multiplexer requires about 4 logical NAND gates, so the total cost of one large multiplexer is about 2^20=1 million NAND gates. The permutation unit would require 1K of these large multiplexers operating in parallel, or (2^10)*(2^20)=2^30 logic gates, or about 1 billion logic gates. Clearly, such a parallel permutation unit would require too many gates and too much power.

A Serial Encryption Unit

However, a serial permutation unit which can permute the order of rows in a 2D matrix with L=1K rows and W=64 bits per row can be constructed with very low cost using memory. A serial encryption unit 220 is shown in FIG. 10B. The rows can read from a first buffer 202a in a linear order, and the rows can be written into a second buffer 202b in a permuted order. A counter 222 can count from 1 to L, and provide the counter value to the address-table 216. The address-table 216 will translate a counter value between 1 and L to another value (a memory address) between 1 and L, to effectively perform a permutation of all L values. The buffer 202a can read addresses in a linear order, using the counter value. The address-table 216 will provide a memory address of a row to written, to buffer 202b. Each read or write operation requires a 10 bit memory address, to specify one row out of L=1K rows. The total number of bits in the address-table 216 to perform a permutation is (L=1K rows)* (10 bits per row)=10K bits. These 10K bits represent a secret long pseudo-random permutation key.

A permutation of the rows can also be performed using alternative mode of operation. The rows can read from a first buffer 202a in a permuted order, and the rows can be written into a second buffer 202b in a linear order. This option requires that memory 202a have an address-table 216.

The XOR-unit 204a can perform a logical XOR of the L=64 bit word being read from memory 202a, with the corresponding row of the first XOR-key, before it is written to memory 202b. The XOR-unit 204b can perform a logical XOR of the L=64-bit word being read from memory 202b, with the corresponding row of the second XOR-key, before it is forwarded over the wire 218.

The cost to implement this serial permutation unit equals the cost of 2 buffer memories (202a and 202b), the cost of 1 memory for the address-tables 216 to store the permutation, the cost of memory to store 2 XOR-keys, and the cost of the 2 XOR-units (204a and 204b). The costs of the first two buffer memories is 2*L*W bits, or 128 Kbits. The cost of the memory for the address table 216 is 10K bits. The cost of the 2 memories for XOR keys is 16 Kbytes, and the cost of the 2 XOR-units is 128 exclusive-or gates. Ideally, the encryption can performed when the packet is moved between 2 existing buffers, in which case the cost of the buffers 202a and 202b is not needed. In this case, the cost of encryption or decryption is very low.

To achieve a lower level of security and smaller keys, the serial unit can be modified to encrypt smaller subsets of the 2D L*W matrix of bits, using the same keys. One with ordinary skill in the art can perform such modifications. Furthermore, the encryption unit is effectively pipelined, and takes 1 time-slot. An encrypted packet can exit the encryption unit 220 as a new packet enters, in each time-slot. When a packet is not encrypted, a controller (not shown) can control a multiplexer and de-multiplexer, to simply store the packet for 1 time-slot, so that it exits at the proper time.

The cost of the serial encryption unit 220 is negligible in a modern ASIC integrated circuit which can contain a billion logic gates and a billion bits of memory. The cost of the serial encryption unit 220 also negligible in a modern FPGA integrated circuit which can contain about 10 million logic gates and about 100 Megabits of memory. An FPGA should be able to hold 7 or more encryption units per megabit of memory. If 10% of the FPGA memory is used for encryption keys, then about 70 encryption units can be realized on one FPGA. Assuming each unit can be clocked at 400 MHz, the total throughput is (70*64*400 Mhz)=1.79 Terabits per second.

The proposed serial encryption scheme can be viewed as performing a cipher in each column with 1,024 bits. According to [10], the number of steps of computation a cyber-attacker must perform to break a XPX cipher with B bits is about $2^{\wedge}(B/2)$. In our case, a cyber-attacker must perform about $2^{\wedge}512$ steps of computation, or about $10^{\wedge}154$ steps of computation. The age of the universe is estimated to be 13.8 billion years, or about $10^{\wedge}17$ seconds. Clearly, the security of the proposed serial XPX scheme is very strong.

The serial permutation unit can also be clocked at a very high data rate. Memories in a modern ASIC processor chip can be read at clock rates of about 5 Gigahertz. Thousands of these units can be implemented on an ASIC integrated circuit, to provide an aggregate data rate of hundreds of Terabits per second.

The same serial encryption unit 220 in FIG. 10B can perform the serial decryption. The first memory 202a can read rows in a linear order, and write the rows to a permuted address on memory 202b to perform the inverse permutation. The address-table 216 performs the inverse permutation. (Alternatively, the rows can be read from the memory 202a according to the inverse permutation, and they can be written to the second memory in a linear order. In either case, the end result is the same.) Hence, in the switches in FIGS. 8A and 8B, the decryption/encryption unit 220 represents the serial encryption unit shown in FIG. 10B.

A More Complex Serial Encryption Unit

The encryption scheme can be made more complex and its security can be improved, by adding more XOR-units and more hardware to perform serial permutations. One may increase the number of rounds of processing of the XPX scheme. For example, a more complex scheme can use 2 permutation units and 3 XOR units, and can be denoted an XPXPX encryption scheme. In general, a serial encryption scheme can use R pseudo-random permutations and (R+1) pseudo-random XOR keys. The analysis for these cases is given in by Chen and Steinberger, "Tight Security bounds for key-alternating ciphers", 2014.

The AES encryption scheme described in [8] uses 'Substitution boxes' (S-boxes), where each byte is translated to a new value based upon a S-box lookup table. The serial encryption unit 2200 and the serial decryption unit 220 can also use S-boxes, to add more security.

Finally, an extra layer of XPX encryption and decryption can also be performed at the Application layer (layer 4), to further strengthen security and privacy. An application program may encrypt large blocks of data, with between 8 and 64 Kbytes of data, Consider a 64 K yte block arranged a 2D matrix with 64 bits per row, and 8K rows. According to [10], the number of steps of computation a cyber-attacker must perform to break a XPX cipher with B bits is about $2^{\wedge}(B/2)$. In this case, a cyber-attacker must perform about $2^{\wedge}4096$ steps of computation, or about $10^{\wedge}1232$ steps of computation. The security of the proposed serial XPX scheme is very strong.

Detecting Un-Authorized Transmissions

In accordance with another aspect of the disclosure, the controller 16 at each input port of a CIOQ packet switch, or the controller 16 for each row of an XQ switch, can have a counter (not shown) to count the number of received packets per DTF per scheduling frame. In this manner, every DPS acts as a 'monitor', looking for any violation of the deterministic service allocated to each DTF (or class of traffic) and to each transmission link (fiber) in each scheduling frame. If any DPS transmits one packet too few for a DTF in one scheduling frame, the counter at the receiving DPS will detect this situation. The SDN control-plane could require every source of a DTF to transmit packets at the guaranteed-rate, to provide extra security. If any DPS transmits one packet too many for a DTF (or class of traffic) in one scheduling frame, the receiving DPS will detect the anomaly can inform the SDN control-plane 110 over the special 'Control-DVN'. The duration of a scheduling frame is typically several microseconds, so this self-monitoring ability provides an extreme level of cyber-security. The SDN control-plane can enable or disable these counters, for every DTF or class of traffic.

In addition, these controllers 16 each have a second RX-schedule, which identifies the the DTF which has a reservation to be received in each time-slot of a scheduling frame. If any packet arrives during a time-slot in which no arrival is scheduled, then an un-authorized transmission has occurred, and the SDN control-plane can be informed for corrective action. The SDN control-plane 110 can configure each DTF to transmit packets at its guaranteed rate. Therefore, it is impossible for a cyber-attacker to transmit even 1 single packet without being detected, since such a transmission would violate the second RX-schedule at some switch.

When any packet is decrypted, at a deterministic packet switch or a Guaranteed-Rate Transceiver, its DTF-AUTHORIZATION key is checked. Any received packet with an invalid key is detected immediately, and the SDN control-plane can be in formed for corrective action.

No bandwidth can be compromised; Even a single extra or missing packet transmission on any fiber in the network can be detected. It would be impossible for an unauthorized cyber-attacker to 'splice into the fiber' of the deterministic IoT to eavesdrop without detection, since the disruption of even a single packet (representing about 30 nanoseconds of time) will be detected.

SUMMARY

The previous embodiments are intended to be illustrative only and in no way limiting. The described embodiments of carrying out the invention are susceptible to many modifications of form, arrangement of parts, details and order of operation. The invention, rather, is intended to encompass all such modifications within its scope, as defined by the claims.

For example, the queues in the routers have been described as N*M queues. In practice, some of these queues may reside in the same memory module, and they may be defined through pointers to memory, and they may exist only as logical abstractions. In an IQ switch, M of the queues at each input port could reside in one memory and one queue, which is partitioned into M partitions. The partitions may be defined through pointers to memory. This variation is easily handled with the proposed methods. In another example, the plurality of deterministic schedules for a switch may be stored as one large schedule. They may be stored as one large schedule in one large memory, which may be partitioned into several smaller memories. Alternatively, the schedules may be stored in smaller memories distributed through the switch. In another example, the disclosure discusses one optical-to-electrical converter per input port, and one electrical-to-optical converter per output port. However, an input port and output port can have a plurality of such converters, to increase the data-rates. The switches can operate with a speedup, to transfer multiple packets between an input port and an output port per time-slot. Similarly, this disclosure illustrates that each input port may have M queues to buffer packets directed to M output ports, but an input port may have a plurality of K*M queues to buffer packets directed to M output ports, thereby providing the capacity to transmit K packets per time-slot to increase data-rates. A 'Deterministic Traffic Flow' with a guaranteed data-rate can also be called a 'Guaranteed-Rate traffic flow'.

What is claimed is:

1. A method for a network control-plane to control a plurality of "deterministic packet switches" (D-switches) to deliver "deterministic traffic flows" (D-flows) through a packet-switched network, wherein each D-flow is associated with a deterministic data-rate requirement given a periodic (repeating) scheduling-frame that includes F time-slots for a positive integer F, wherein each one of said plurality of D-switches includes:

N input ports, each including a data receiver for integer N,

M output ports, each including a data transmitter for integer M,

N×M queues, wherein queue (J,K) buffers data that arrives at input port (J) and that departs from output port (K), for integers J and K wherein $1<=J<=N$ and $1<=K<=M$, a first memory for storing a secret key, a decryption unit, for decrypting encrypted data, a second memory for storing a plurality of schedules, a switch-controller operable to receive encrypted data from said network control-plane performing said method, and to decrypt said data using said decryption unit and said secret key, to yield a decrypted message from said network control-plane, for one (or more) of said plurality of D-switches, said method comprising:

determining which of said D-flows (if any) will arrive at each one of said N input ports of said D-switch, and which of said D-flows (if any) will depart from each one of said M output ports of said D-switch, determining a deterministic data-rate requirement for each input port (J), sufficient to satisfy the sum of the deterministic data-rate requirements of those D-flows which arrive at said input port (J), determining a deterministic data-rate requirement for each queue (J,K), sufficient to satisfy the sum of the deterministic data-rate requirements of those D-flows which arrive at input port (J) and depart from output port (K);

determining a "periodic queue-schedule" (Q-schedule) associated with each queue (J,K), and also associated with input port (J), which identifies the time-slots within said periodic scheduling-frame with reservations to remove data from said queue (J,K) and forward said data to output port (K), wherein the Q-schedules associated with input port (J) provide said input port (J) with a guaranteed number of reservations to forward data within said periodic scheduling-frame, sufficient to meet its deterministic data-rate requirement, wherein said Q-schedule associated with queue (J,K) provides said queue (J,K) with a guaranteed number of reservations to forward data within said periodic scheduling-frame, sufficient to meet its deterministic data-rate requirement, sending encrypted data to said D-switch, with a message instructing said switch-controller of said D-switch to store one (or more) of said Q-schedules in said second memory.

2. The method of claim 1, wherein each one of said plurality of D-switches further includes:

a third memory to store a plurality of schedules, for one (or more) of said plurality of D-switches, and for each input port (J) of said D-switch, said method further comprising:

determining a "periodic reception-schedule" (RX-schedule) associated with said input port (J), which identifies the time-slots with reservations for data to arrive at said input port (J) within said periodic scheduling-frame, wherein said RX-schedule for said input port (J) provides a guaranteed number of reservations for data to arrive at said input port (J) within said periodic scheduling-frame, sufficient to meet its deterministic data-rate requirement, sending encrypted data to said D-switch, instructing said switch-controller of said D-switch to store said one (or more) of said RX-schedules in said third memory.

3. The method of claim 2, wherein for each input port (J) of said D-switch, and for the RX-schedule associated with said input port (J), said method ensures that:

the number of reservations for data to arrive at said input port (J) in the first half of said RX-schedule, differs from the number of reservations for data to arrive at said input port (J) in the second half of said RX-schedule, by at most F/4.

4. The method of claim 2, wherein said D-switch further comprises:
an encryption unit to encrypt data,
wherein said switch-controller is operable to encrypt data using said encryption unit and said secret key, and send said encrypted data from said D-switch to said network control-plane,
wherein said encrypted data includes a message from said switch-controller to said network control-plane,
wherein said message notifies said network control-plane that a violation of a logical condition required for correct operation of said D-switch has occurred.

5. The method of claim 4, wherein said message will notify said network control-plane that for one particular input port (J), data has arrived at said input port (J), in a time-slot for which no reservation for the arrival of data has been made in the RX-schedule associated with said input port (J).

6. The method of claim 4, wherein said message will notify said network control-plane that for one particular input port (J), the number of time-slots in which data arrives at said input port (J) in one periodic scheduling-frame comprising F time-slots, exceeds the number of time-slot reservations for the arrival of data at said input port (J), in the RX-schedule associated with input port (J).

7. The method of claim 2, wherein for each one of said plurality of D-switches, the third memory is distributed over the N input ports of said D-switch, wherein third memory (J) stores the RX-schedule associated with input port (J), for 1<=J<=N.

8. The method of claim 1, wherein for each one of said plurality of D-switches, and for each queue (J,K) and for the Q-schedule associated with said queue (J,K), said method ensures that:
for each half of said Q-schedule including F/2 consecutive times-slots, the number of reservations for the forwarding of data in the first half of said Q-schedule, differs from the number of reservations for the forwarding of data in the second half of said Q-schedule, by at most F/4.

9. The method of claim 1, wherein a plurality of Q-schedules associated with a plurality of queues are combined into a "combined-schedule" stored in said second memory,
wherein each time-slot in said combined-schedule identifies those queues (if any) with reservations to forward data.

10. The method of claim 1, wherein for one (or more) of said plurality of D-switches, the second memory is distributed over the N input ports of said D-switch, wherein memory (J) stores those Q-schedules associated with input port (J), for 1<=J<=N.

11. The method of claim 1, wherein each one of said plurality of D-switches further includes a fourth memory to store a flow-table, wherein for each one of said plurality of D-switches, said method further comprises:
determining a flow-table for said D-switch, that contains a row of data for each one of said plurality of D-flows that traverses said D-switch, wherein for each D-flow that traverses said D-switch, said row of data contains an incoming flow-label, an outgoing flow-label, and an integer K identifying the output port over which data for said D-flow must depart,
sending encrypted data to said D-switch, with a message instructing said switch-controller of said D-switch to store at least one of said rows of data into said flow-table in said fourth memory.

12. The method of claim 11, wherein for each one of said plurality of D-switches, said fourth memory is distributed over the N input ports of said D-switch, wherein fourth memory (J) stores the rows of data of said flow-table for those D-flows that arrive at input port (J), for 1<=J<=N.

13. The method of claim 1, wherein said D-switch further includes a memory to store a plurality of secret keys, wherein for one (or more) of said plurality of D-flows delivered through said packet switched network, determining a secret key to encrypt and decrypt the data associated with said D-flow, and the method further comprises storing said plurality of secret keys in said memory.

14. The method of claim 13, wherein one (or more) of said plurality of secret keys comprises at least 128 bits and at most 256 bits, to achieve a strong level of security.

15. The method of claim 13, wherein one (or more) of said plurality of secret keys comprises at least 256 bits and at most 512 bits, to achieve a very strong level of security.

16. The method of claim 13, wherein one (or more) of said plurality of secret keys comprises at least 512 bits, to achieve an exceptionally-high level of security.

17. A "deterministic packet switch" (D-switch) for switching a plurality of "deterministic traffic flows" (D-flows) over a set of output ports, under the control of a network control-plane, wherein each D-flow is associated with a deterministic data-rate requirement given a periodic (repeating) scheduling-frame including F time-slots for positive integer F, said D-switch comprising:
N input ports, each including a data-receiver for integer N,
M output ports, each including a data-transmitter for integer M,
N×M queues, wherein queue (J,K) buffers data that arrives at input port (J) and that departs from output port (K), for integers J and K wherein 1<=J<=N and 1<=K<=M,
a first memory for storing a secret key,
a second memory for storing a plurality of schedules,
a decryption unit, to decrypt encrypted data,
wherein said switch-controller can decrypt encrypted data received from said network control-plane, using said decryption unit and said secret key in said first memory, to yield a decrypted message received from said network control-plane,
wherein each input port (J) is associated with a deterministic data-rate requirement, sufficient to satisfy the sum of the deterministic data-rate requirements of those D-flows which arrive at said input port (J),
wherein each queue (J,K) is associated with a deterministic data-rate requirement, sufficient to satisfy the sum of the deterministic data-rate requirements of those D-flows which arrive at input port (J) and depart from output port (K),
wherein said second memory stores a plurality of "periodic queue-schedules" (Q-schedules), wherein one Q-schedule is associated with each queue (J,K) and is also associated with input port (J),
wherein the Q-schedule associated with queue (J, K) identifies the time-slots with reservations to remove data from said queue (J,K) and forward said data to said output port (K), within said periodic scheduling-frame,
wherein the Q-schedules associated with input port (J) provide said input port (J) with a guaranteed number of reservations to forward data in said periodic scheduling-frame, sufficient to satisfy its deterministic data-rate requirement, wherein said Q-schedule associated with queue (J,K) provides said queue (J,K) with a guaranteed number of reservations to forward data in said periodic scheduling-frame, sufficient to satisfy its deterministic data-rate requirement, wherein said decrypted message from said network control-plane instructs said switch-controller to store one (or more) of said Q-schedules stored in said second memory.

18. The deterministic packet switch (D-switch) from claim 17, further comprising:
a third memory for storing a plurality of "periodic reception-schedules" (RX-schedules),
wherein the RX-schedule associated with input port (J) identifies the time-slots (if any) with a reservation for data to arrive at said input port (J) within said periodic scheduling-frame,
wherein said RX-schedule provides said input port (J) with a guaranteed number of time-slot reservations for the arrival of data at said input port (J) in said periodic scheduling-frame, sufficient to satisfy its deterministic data-rate requirement,
wherein said decrypted message instructs said switch-controller to store one (or more) of said periodic RX-schedules stored in said third memory.

19. The D-switch of claim 18, wherein for each input port (J) of said D-switch, and for the RX-schedule associated with said input port (J), for each half of said RX-schedule comprising F/2 consecutive time-slots, the number of reservations for the arrival of data in the first half of said RX-schedule, differs from the number of reservations for the arrival of data in the second half of said RX-schedule, by at most F/4 time-slots.

20. The D-switch of claim 18, further comprising:
an encryption unit to encrypt data,
wherein for each input port (J) of said D-switch, said switch-controller will observe the time-slots in which data arrives at said input port (J), to detect un-authorized data which arrives at said input port (J) in a time-slot for which no reservation for the arrival of data has been scheduled in the RX-schedule associated with said input port (J),
wherein said switch-controller will send encrypted data to said network control-plane, informing said control-plane that a violation of a logical condition required for correct operation of said D-switch has occurred.

21. The D-switch of claim 18, further comprising:
an encryption unit to encrypt data,
wherein for each input port (J) of said D-switch, said switch-controller will count the number of time-slots in said periodic scheduling-frame in which data arrives at said input port (J), and compare said number with a second number equaling the number of time-slot reservations made in the RX-schedule associated with said input port (J) for the arrival of data, to detect un-authorized arrivals of data which occur when the first number exceeds the second number,
wherein said switch-controller will send encrypted data to said network control-plane, informing said control-plane that a violation of a logical condition required for correct operation of said D-switch has occurred.

22. The D-switch of claim 18, wherein said third memory is distributed over the N input ports, wherein third memory (J) stores the RX-schedule associated with input port (J), for $1<=J<=N$.

23. The D-switch of claim 18, realized with an integrated circuit.

24. The D-switch of claim 23, wherein said integrated circuit comprises a Field Programmable Gate Array (FPGA) or an Application Specific Integrated Circuit (ASIC).

25. The D-switch of claim 17, wherein a plurality of Q-schedules associated with a plurality of queues are combined into a "combined-schedule" stored in said second memory, wherein each time-slot in said combined-schedule identifies those queues (if any) with reservations to forward data.

26. The D-switch of claim 17, wherein for each queue (J,K) of said D-switch, and for the Q-schedule associated with said queue (J,K), for each half of said Q-schedule comprising F/2 consecutive time-slots, the number of reservations for the forwarding of data to output port (K) in the first half of said Q-schedule, differs from the number of reservations for the forwarding of data to output port (K) in the second half of said Q-schedule, by at most F/4 time-slots.

27. The switch of claim 17, wherein said second memory is distributed over the N input ports, wherein second memory (J) stores the Q-schedules associated with input port (J), for $1<=J<=N$.

28. The D-switch of claim 17, further comprising:
a fourth memory for storing a flow-table,
wherein for each D-flow traversing said D-switch, one row of data in said flow-table specifies an incoming flow-label, an outgoing flow-label, and an integer K representing the output port from which said D-flow will depart.

29. The D-switch of claim 28, wherein said decrypted message from said network control-plane instructs said switch-controller to store one (or more) rows of data in the flow-table stored in said fourth memory.

30. The D-switch of claim 28, wherein said fourth memory is distributed over the N input ports of said D-switch; wherein fourth memory (J) stores the rows of data in said flow-table for those D-flows that arrive at input port (J), for $1<=J<=N$.

31. The D-switch of claim 17, realized with an integrated circuit.

32. The D-switch of claim 31, wherein said integrated circuit comprises a Field Programmable Gate Array (FPGA).

33. The D-switch of claim 31, wherein said integrated circuit comprises an Application Specific Integrated Circuit (ASIC).

* * * * *